(12) United States Patent
Baron et al.

(10) Patent No.: US 10,966,247 B2
(45) Date of Patent: Mar. 30, 2021

(54) QUEUES MANAGEMENT FOR MULTI-USER AND SINGLE USER EDCA TRANSMISSION MODE IN WIRELESS NETWORKS

(71) Applicant: CANON KABUSHIKI KAISHA, Tokyo (JP)

(72) Inventors: Stéphane Baron, Le Rheu (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 15/917,353

(22) Filed: Mar. 9, 2018

(65) Prior Publication Data

US 2018/0270861 A1 Sep. 20, 2018

(30) Foreign Application Priority Data

Mar. 14, 2017 (GB) .................................... 1704074

(51) Int. Cl.
*H04L 1/00* (2006.01)
*H04W 74/08* (2009.01)
(Continued)

(52) U.S. Cl.
CPC ..... *H04W 74/0816* (2013.01); *H04L 47/2466* (2013.01); *H04L 47/52* (2013.01);
(Continued)

(58) Field of Classification Search
CPC . H04L 47/6215; H04L 47/52; H04L 47/2466; H04L 47/2491; H04L 12/873; H04L 12/855; H04W 74/0816; H04W 72/0413; H04W 28/0268; H04W 74/08; H04W 72/04; H04W 28/02

See application file for complete search history.

(56) References Cited

U.S. PATENT DOCUMENTS

| 2002/0075852 A1* | 6/2002 | Preiss ..................... H04L 47/24 370/352 |
| 2003/0012209 A1* | 1/2003 | Abdelilah ........... H04L 47/2441 370/412 |

(Continued)

FOREIGN PATENT DOCUMENTS

GB 2543584 A 4/2017

*Primary Examiner* — Abdelillah Elmejjarmi
(74) *Attorney, Agent, or Firm* — Canon U.S.A., Inc. IP Division

(57) ABSTRACT

The present invention provides according to one of its aspects a method of queueing a data frame in one of a plurality of traffic queues at a communication station for transmission over a communication channel in a communication network comprising a plurality stations and an access point (AP). The method comprising selecting a traffic queue based on at least one of 1) a transmission mode, direct link or uplink, of the data frame, and 2) a transmission mode of the traffic queue; and queueing the data frame in the selected traffic queue. The transmission mode of the traffic queue may be a Multi-User (MU) uplink (UL) mode if a data frame previously stored in the traffic queue has been transmitted, since a predetermined period of time, in a resource unit (RU) provided by the AP within a transmission opportunity granted to the AP on the communication channel. The transmission mode may also be a Single-User (SU) mode.

7 Claims, 14 Drawing Sheets

(51) Int. Cl.
    *H04L 12/873*     (2013.01)
    *H04L 12/855*     (2013.01)
    *H04W 28/02*     (2009.01)
    *H04W 72/04*     (2009.01)
    *H04L 12/863*     (2013.01)
    *H04L 12/857*     (2013.01)

(52) U.S. Cl.
    CPC ..... *H04L 47/6215* (2013.01); *H04W 28/0268* (2013.01); *H04W 72/0413* (2013.01); *H04L 47/2491* (2013.01)

(56) References Cited

U.S. PATENT DOCUMENTS

| | | | |
|---|---|---|---|
| 2005/0036448 A1* | 2/2005 | Leeuwen | H04L 47/6215 370/235 |
| 2007/0230493 A1* | 10/2007 | Dravida | H04L 47/621 370/412 |
| 2011/0255618 A1* | 10/2011 | Zhu | H04B 7/0413 375/260 |
| 2013/0064166 A1* | 3/2013 | Calcev | H04W 76/14 370/312 |
| 2015/0245360 A1* | 8/2015 | Gao | H04B 7/0452 370/329 |
| 2019/0007973 A1* | 1/2019 | Lou | H04W 72/082 |

\* cited by examiner

| AC | $CW_{min}$ | $CW_{max}$ | AIFSN |
|---|---|---|---|
| AC_BK | aCWmin | aCWmax | 7 |
| AC_BE | aCWmin | aCWmax | 3 |
| AC_VI | (aCWmin+1)/2-1 | aCWmin | 2 |
| AC_VO | (aCWmin+1)/4-1 | (aCWmin+1)/2-1 | 2 |

| AC | MU $CW_{min}$ | MU $CW_{max}$ | MU AIFSN |
|---|---|---|---|
| AC_BK | aCWmin | aCWmax | 14 |
| AC_BE | aCWmin | aCWmax | 10 |
| AC_VI | (aCWmin+1)/2-1 | aCWmin | 9 |
| AC_VO | (aCWmin+1)/4-1 | (aCWmin+1)/2-1 | 9 |

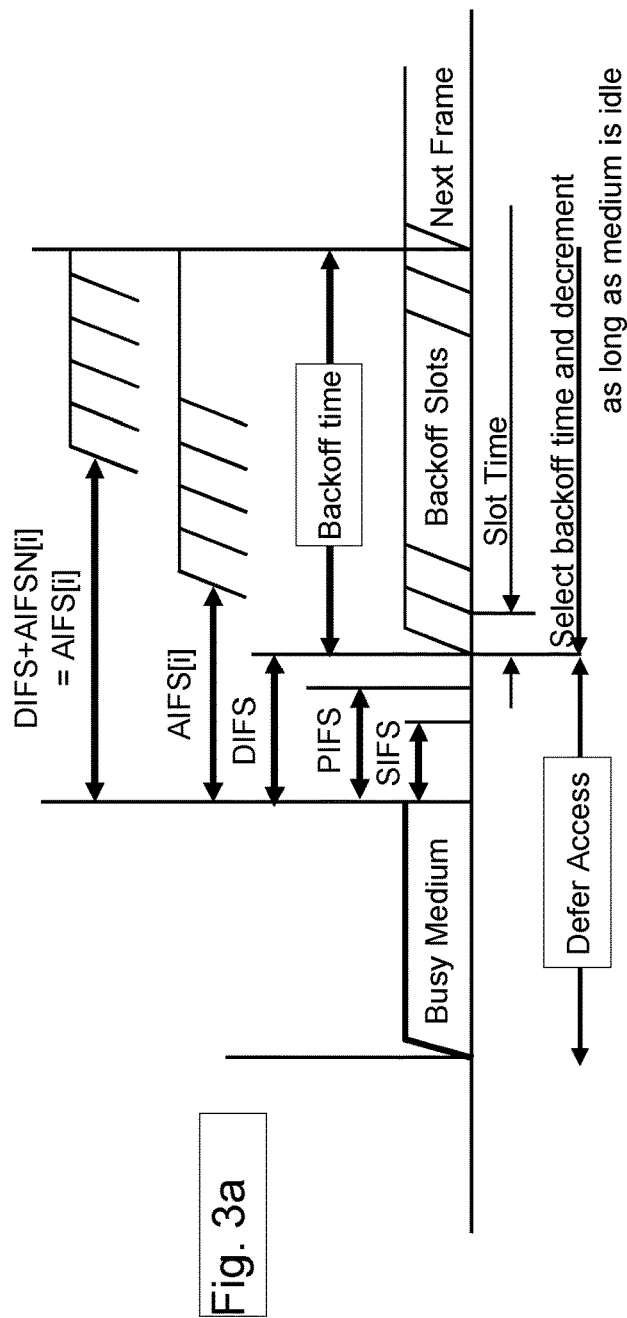

QUEUES MANAGEMENT FOR MULTI-USER AND SINGLE USER EDCA TRANSMISSION MODE IN WIRELESS NETWORKS

PRIORITY CLAIM/INCORPORATION BY REFERENCE

This application claims the benefit under 35 U.S.C. § 119(a)-(d) of United Kingdom Patent Application No. 1704074.2, filed on Mar. 14, 2017 and entitled "QUEUES MANAGEMENT FOR MULTI-USER AND SINGLE USER EDCA TRANSMISSION MODE IN WIRELESS NETWORKS". The above cited patent application is incorporated herein by reference in its entirety.

FIELD OF THE INVENTION

The present invention relates generally to communication networks and more specifically to communication methods in networks providing accesses to sub-channels (or Resource Units) splitting a transmission opportunity TXOP granted to an access point, in order to transmit data.

BACKGROUND OF THE INVENTION

The IEEE 802.11 MAC family of standards (a/b/g/n/ac/ etc.) defines a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations to simultaneously transmit. To actually perform such multi-user transmission, it has been proposed to split a granted communication channel into sub-channels, also referred to as resource units (RUs), that are shared in the frequency domain by multiple users (non-AP stations/nodes), based for instance on Orthogonal Frequency Division Multiple Access (OFDMA) technique.

A 802.11ax node has thus the opportunity to gain access to the medium via two access schemes: MU UL access scheme and conventional EDCA (Enhanced Distributed Channel Access) contention-based access scheme.

From 802.11e introduction, and later with 802.11z the station have the possibility to establish direct link communications between peer stations within a basic service set without traversing the AP. For the time being, a direct link communication has not the ability to use the MU UL access scheme coordinated by an AP.

Typically, a 802.11ax station has several types of data to be sent with different QoS requirements. In particular, it may have some data to be sent in direct link and other data to be sent in non-direct link via the AP (in order to take advantage of the MU UL access scheme).

Proposed solutions known in the prior-art for managing both direct link transmission and no direct link transmission are not satisfactory, particularly when MU UL access scheme is provided by the Access Point and to be used by the stations.

SUMMARY OF INVENTION

The present invention seeks to overcome the foregoing limitations. In particular, it seeks to ensure the coexistence between the direct link and the Multi user uplink communication mechanisms.

According to a first embodiment of the invention there is provided a method of queueing a data frame in one of a plurality of traffic queues at a communication station for transmission over a communication channel in a communication network comprising a plurality stations and an access point (AP), the method comprising:
  selecting a traffic queue based on at least one of:
    a transmission mode, direct link or uplink, of the data frame, and
    a transmission mode of the traffic queue; and
  queueing the data frame in the selected traffic queue;
wherein:
  the transmission mode of the data frame is one of: a direct link mode if the data frame is to be addressed to a non-AP station, and an uplink mode if the data frame is to be addressed to the AP; and
  the transmission mode of the traffic queue is one of: a Multi-User (MU) uplink (UL) mode if a data frame previously stored in the traffic queue has been transmitted, since a predetermined period of time, in a resource unit (RU) provided by the AP within a transmission opportunity granted to the AP on the communication channel, and Single-User (SU) mode otherwise.

In one implementation, the method further comprising:
  determining a traffic queue in SU mode; and
  wherein the determined traffic queue is selected for queueing the data frame if the transmission mode of the data frame is direct link.

In one implementation, the plurality of traffic queues are configured to serve data traffic at different priorities, and wherein the determined traffic queue in SU mode is a SU traffic queue which priority is not greater than the priority of the data frame.

In one implementation, the plurality of traffic queues are configured to serve data traffic at different priorities, the method further comprising:
  determining a priority of the data frame; and
  determining a traffic queue based on the priority of the data frame.

In particular, the determined traffic queue is the traffic queue which priority corresponds to the priority of the data frame.

In one variant, the determined traffic queue is selected for queueing the data frame if the transmission mode of the traffic queue is SU mode and the transmission mode of the data frame is uplink.

In another variant, a traffic queue in SU mode is selected for queueing the data frame if the transmission mode of the traffic queue is MU UL mode and the transmission mode of the data frame is direct link.

Correspondingly, the invention also regards a communication device station in a communication network comprising a plurality of stations and an access point (AP), the communication device comprising:

a plurality of traffic queues;

at least one microprocessor configured for carrying out the following steps:

obtaining a data frame to be queued in one of the plurality of traffic queues for transmission;

selecting a traffic queue based on at least one of:

a transmission mode, direct link or uplink, of a data frame, and a transmission mode of the traffic queue; and queueing the data frame in the selected traffic queue; wherein:

the transmission mode of the data frame is one of: a direct link mode if the data frame is to be addressed to a non-AP station, and an uplink mode if the station is to be addressed to the AP; and the transmission mode of the traffic queue is one of: a Multi-User (MU) uplink (UL) mode if a data frame previously stored in the traffic queue has been transmitted, since a predetermined period of time, in a resource unit (RU) provided by the AP within a transmission opportunity granted to the AP on the communication channel, and Single-User (SU) mode otherwise.

According to a second embodiment of the invention there is provided a method of queueing a data frame in one of a plurality of traffic queues at a communication station for transmission over a communication channel in a communication network comprising a plurality stations and an access point (AP), the plurality of traffic queues being configured to serve data traffic at different priorities, the method comprising:

determining a priority of the data frame;

determining a traffic queue based on the priority of the data frame;

determining whether the transmission mode of the determined traffic queue is Multi-User (MU) uplink (UL), wherein a traffic queue is in MU UL mode if a data frame previously stored in the traffic queue has been transmitted, since a predetermined period of time, in a resource unit (RU) provided by the AP within a transmission opportunity granted to the AP on the communication channel;

if the transmission mode of the traffic queue is MU UL mode and the data frame is addressed to a non-AP station (direct link mode), modifying the transmission mode of the data frame to uplink; and queueing the data frame with the modified transmission mode in the determined traffic queue for transmission.

Correspondingly, the invention also regards a communication device station in a communication network comprising a plurality of stations and an access point (AP), the communication device comprising:

a plurality of traffic queues serving data traffic at different priorities;

at least one microprocessor configured for carrying out the following steps:

obtaining a data frame to be queued in one of the plurality of traffic queues for transmission;

determining a priority of the data frame;

determining a traffic queue based on the priority of the data frame;

determining whether the transmission mode of the determined traffic queue is Multi-User (MU) uplink (UL), wherein a traffic queue is in MU UL mode if a data frame previously stored in the traffic queue has been transmitted, since a predetermined period of time, in a resource unit (RU) provided by the AP within a transmission opportunity granted to the AP on the communication channel;

if the transmission mode of the traffic queue is MU UL mode and the data frame is addressed to a non-AP station (direct link mode), modifying the transmission mode of the data frame to uplink; and queueing the data frame with the modified transmission mode in the determined traffic queue for transmission.

Another aspect of the invention relates to a non-transitory computer-readable medium storing a program which, when executed by a microprocessor or computer system in a device, causes the device to perform any method as defined above.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 3a illustrates 802.11ac mechanism for the backoff counter countdown;

FIG. 3b illustrates an example of mapping between eight priorities of traffic class and the four EDCA ACs;

DETAILED DESCRIPTION

The invention will now be described by means of specific non-limiting exemplary embodiments and by reference to the figures.

Figure 1:
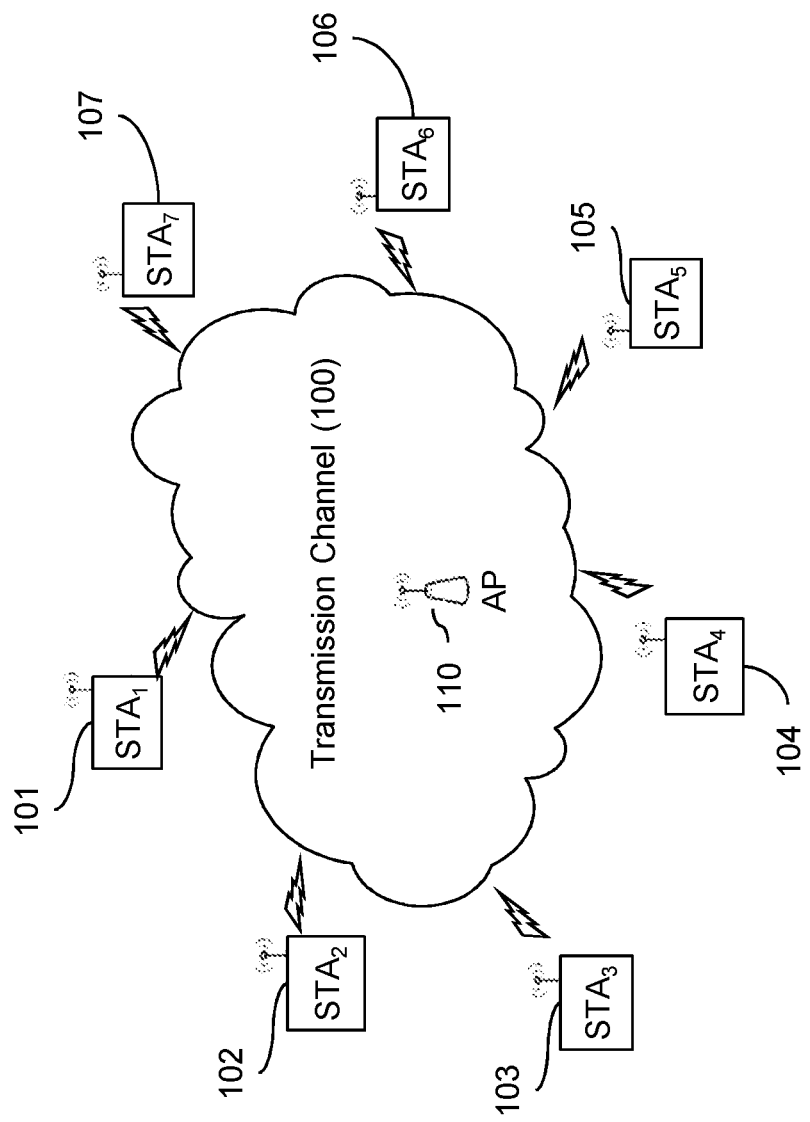
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110 with which the nodes have registered. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting node, including the AP, first attempts, through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle.

To access the medium, the node starts a countdown backoff counter designed to expire after a number of timeslots, chosen randomly in a so-called contention window [0, CW], CW being an integer. In the following, CW is also referred to as the contention window for simplicity. This backoff mechanism or procedure, also referred to as channel access scheme, is the basis of the collision avoidance mechanism that defers the transmission time for a random interval, thus reducing the probability of collisions on the shared channel. After the backoff time period (i.e. the backoff counter reaches zero), the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard, thus protecting data transmissions from any further collisions. The four-way CTS/RTS handshaking mechanism is well known, and thus not further described here. Reference is made to the standard for further details.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS (DCF inter-frame space) or when the backoff counters of the two (or more) source nodes have reached zero nearly at the same time. If both source nodes use the RTS/CTS mechanism, this collision can only occur for the RTS frames. Fortunately, such collision is early detected by the source nodes upon not receiving a CTS response.

Management of quality of service (QoS) has been introduced at node level in such wireless networks, through well-known EDCA mechanism defined in the IEEE 802.11e standard.

Indeed, in the original DCF standard, a communication node includes only one transmission queue/buffer. However, since a subsequent data frame cannot be transmitted until the transmission/retransmission of a preceding frame ends, the delay in transmitting/retransmitting the preceding frame prevented the communication from having QoS.

Figures 2A, 2B, 2C:
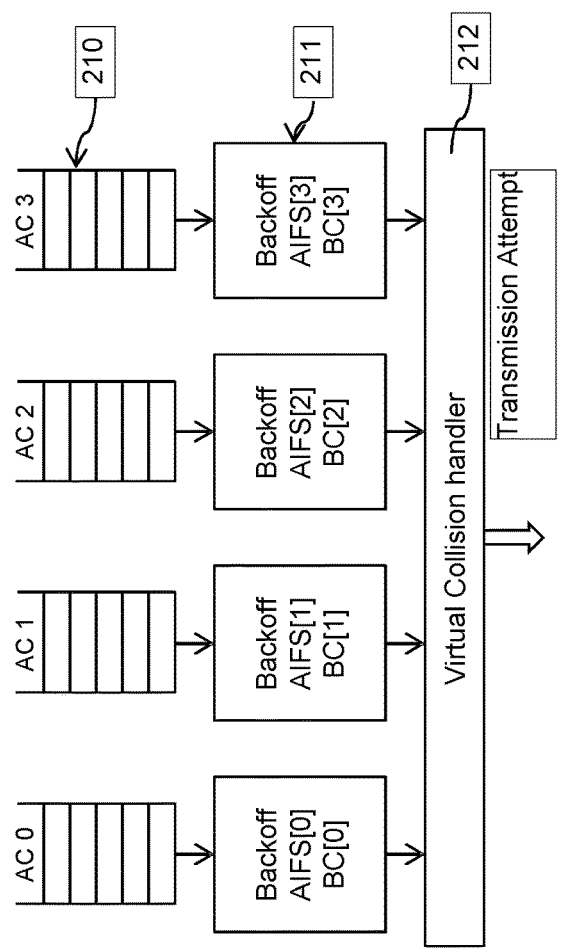
FIGS. 2a, 2b illustrate the IEEE 802.11e EDCA involving access categories.
FIG. 2c illustrates an example of values for the MU EDCA parameters set.

FIGS. 2a and 2b illustrate the IEEE 802.11e EDCA mechanism involving access categories, in order to improve the quality of service (QoS).

The 802.11e standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed to support prioritized traffics similar to DiffServ (Differentiated Services), which is a protocol for specifying and controlling network traffic by class so that certain types of traffic get precedence.

EDCA is the dominant channel access scheme or mechanism in WLANs because it features a distributed and an easy to deploy mechanism. The scheme contends for access to at least one communication channel of the communication network using contention parameters, in order for the node to transmit data stored locally over an accessed communication channel.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (210). Usually, the four ACs are the following in decreasing priority order: voice (or "AC_VO"), video (or "AC_VI"), best effort (or "AC_BE") and background (or "AC_BG").

Of course, another number of traffic queues may be contemplated.

Each AC has its own traffic queue/buffer to store corresponding data frames to be transmitted on the network. The MAC data frames including payload data incoming from an upper layer of the protocol stack (namely the MSDUs) are mapped onto one of the four AC queues/buffers and thus input in the mapped AC buffer.

Figure 8B:
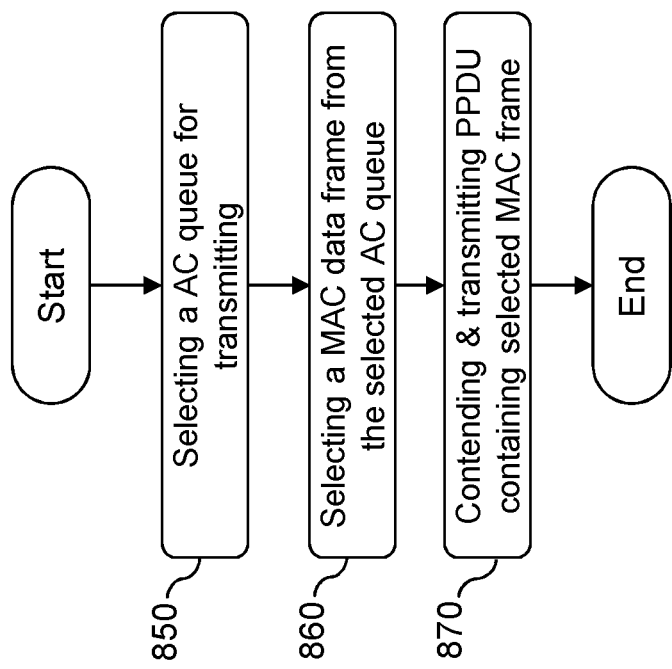
FIG. 8b illustrates a conventional mechanism for transmitting a physical layer convergence protocol (PLCP) protocol data units (PPDU)
Figure 8A:
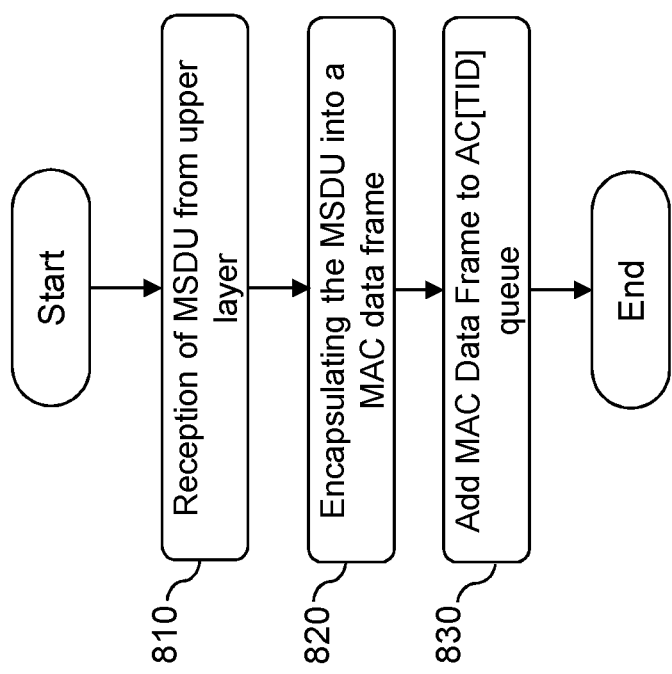
FIG. 8a illustrates a conventional mechanism for queueing payload data received from an upper layer.

FIG. 8a illustrates a conventional mechanism for queueing payload data received from an upper layer. At step 810, a MSDU is received from upper layer for transmission. At step 820, the MSDU is encapsulated into a MAC data frame. The MAC data frame is then added, at step 830, to an AC queue according to the TID (Traffic IDentifier) (cf. FIG. 13b for more details on the TID field included in the header of a MAC frame). Typically, step 830 determines the Access Category corresponding to the TID indicated in the MAC frame and then queues the MAC data frame in the queue corresponding to the determined AC.

Each AC has also its own set of queue contention parameters, and is associated with a priority value, thus defining traffics of higher or lower priority of MSDUs. Thus, there is a plurality of traffic queues for serving data traffic at different priorities. The queue contention (EDCA) parameters usually include $CW_{min}$, $CW_{max}$, AIFSN and TXOP_Limit parameters for each traffic queue. $CW_{min}$ and $CW_{max}$ are the lower and higher boundaries of a selection range from which the EDCA contention window CW is selected for a given traffic queue. AIFSN stands for Arbitration Inter-Frame Space Number, and defines a number of time slots (usually 9 μs), additional to a DIFS interval (the total defining the AIFS period), the node must sense the medium as idle before decrementing the queue backoff value/counter associated with the traffic queue considered. TXOP_Limit defines the maximum size of a TXOP the node may request.

That means that each AC (and corresponding buffer) acts as an independent DCF contending entity including its respective queue backoff engine 211. Thus, each queue backoff engine 211 is associated with a respective traffic queue 210 for using queue contention parameters and setting a respective queue backoff value/counter (randomly selected from the contention window CW), to be used to contend for access to at least one communication channel in order to transmit data stored in the respective traffic queue over an accessed communication channel.

The contention window CW and the queue backoff value/counter are known as EDCA variables.

It results that the ACs within a same communication node compete one with each other to access the wireless medium and to obtain a transmission opportunity, using the conventional EDCA access scheme as explained above for example.

Service differentiation between the ACs is achieved by setting different EDCA (queue backoff) parameters between the ACs, such as different $CW_{min}$, $CW_{max}$, AIFSN and/or different transmission opportunity duration limits (TXOP_Limit). This contributes to adjusting QoS.

The usage of the AIFSN parameter and queue backoff values to access the medium in the EDCA mechanism is described below with reference to FIG. 3a.

FIG. 2b illustrates possible default values for the $CW_{min}$, $CW_{max}$ and AIFSN parameters.

In this table, typical respective values for aCWmin and aCWmax are defined in the above-mentioned standard as being respectively 15 and 1023. Other values may be set by a node in the network (typically an Access Point) and shared between the nodes. This information may be broadcast in a beacon frame.

To determine the delay AIFS[i] between the detection of the medium being free and the beginning of the queue backoff value decrementing for traffic queue 'i', the node multiplies the value indicated in the AIFSN parameter for traffic queue 'i', i.e. AIFSN[i], by a time slot duration (typically 9 micro-seconds), and adds this value to a DIFS duration.

As shown in FIG. 3a, it results that each traffic queue waits an AIFS[i] period (that includes the DIFS period deferring access to the medium) before decrementing its associated queue backoff value/counter. FIG. 3a shows two AIFS[i] corresponding to two different ACs. One can see that one prioritized traffic queue starts decrementing its backoff value earlier than the other less prioritized traffic queue. This situation is repeated after each new medium access by any node in the network.

This decrementing deferring mechanism, additional to the use of an on-average lower CW, makes that high priority traffic in EDCA has a higher chance to be transmitted than low priority traffic: a node with high priority traffic statistically waits a little less before it sends its packet, on average, than a node with low priority traffic.

The EDCA queue backoff values or counters thus play two roles. First, they drive the nodes in efficiently accessing the medium, by reducing risks of collisions. Second, they offer management of quality of service, QoS, by mirroring the aging of the data contained in the traffic queue (the more aged the data, the lower the backoff value) and thus providing different priorities to the traffic queues through different values of the EDCA parameters (especially the AIFSN parameter that delays the start of the decrementing of the EDCA queue backoff values).

Referring back to FIG. 2a, buffers AC3 and AC2 are usually reserved for real-time applications (e.g., voice AC_VO or video AC_VI transmission). They have, respectively, the highest priority and the last-but-one highest priority.

Buffers AC1 and AC0 are reserved for best effort (AC_BE) and background (AC_BG) traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 3b shows an example of mapping between eight priorities of traffic class (User Priorities or UP, 0-7 according to IEEE 802.1d) and the four ACs. The data frame is then stored in the buffer corresponding to the mapped AC.

When the backoff procedure for a traffic queue (or an AC) ends, the MAC controller (reference 704 in FIG. 7 below) of the transmitting node transmits a data frame from this traffic queue to the physical layer for transmission onto the wireless communication network.

FIG. 8b illustrates a conventional mechanism for transmitting a physical layer convergence protocol (PLCP) protocol data units (PPDU).

At step 850, an AC queue from which a MAC data frame is to be transmitted is selected. The selection may be based on the field preferred AC associated with the dedicated resource unit. In the case of a trigger based PPDU, The field preferred AC can be obtained from the parameters of the trigger frame as the AP may designate which type of traffic should be transmitted in a resource unit (RU). In the case of a SU PPDU, the preferred AC is the AC corresponding to the just expired backoff counter.

At step 860, a MAC data frame is taken from the selected AC queue for transmission, and at step 870, the station contends and transmits the PPDU containing the MAC data frame taken from the selected AC queue.

Since the ACs operate concurrently in accessing the wireless medium, it may happen that two ACs of the same communication node have their backoff ending simultaneously. In such a situation, a virtual collision handler (212 in FIG. 2*a*) of the MAC controller operates a selection of the AC having the highest priority (as shown in FIG. 3*b*) between the conflicting ACs, and gives up transmission of data frames from the ACs having lower priorities.

Then, the virtual collision handler commands those ACs having lower priorities to start again a backoff operation using an increased CW value.

The QoS resulting from the use of the ACs may be signalled in the MAC data frames, for instance in a QoS control field included in the header of the IEEE 802.11e MAC frame.

Figure 4:
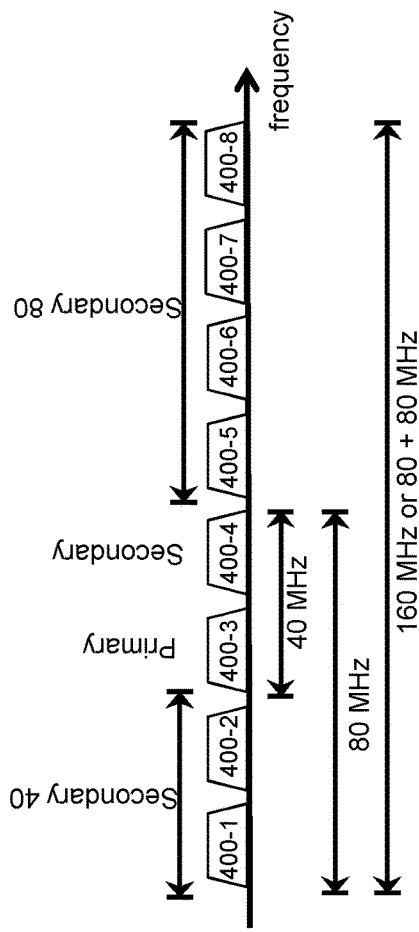
FIG. 4 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 4 illustrates 802.11ac channel allocation that support composite channel bandwidth of 20 MHz, 40 MHz, 80 MHz or 160 MHz.

IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in FIG. 4 and correspond to 20 MHz, 40 MHz, 80 MHz, and 160 MHz channel bandwidths, compared to only 20 MHz and 40 MHz supported by 802.11n. Indeed, the 20 MHz component channels 400-1 to 400-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency-adjacent or contiguous 40 MHz and 20 MHz channels, respectively. However the present invention may have embodiments with either composition of the channel bandwidth, i.e. including only contiguous channels or formed of non-contiguous channels within the operating band.

A node is granted a TXOP through the enhanced distributed channel access (EDCA) mechanism on the "primary channel" (400-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered with the same local Access Point (AP).

However, to make sure that no other legacy node (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions with a main node, usually an AP. In the uplink, multi-user transmissions can be used to mitigate the collision probability by allowing multiple nodes to simultaneously transmit to the AP.

To actually perform such multi-user transmission, it has been proposed to split a granted 20 MHz channel into sub-channels (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 5. The illustrated 20 MHz channels 500-1 to 500-4 may correspond for example, respectively, to channels 400-1 to 400-4 of FIG. 4.

The multi-user feature of OFDMA allows, a node, usually an access point, AP, to assign different RUs to different nodes in order to increase competition. This may help to reduce contention and collisions inside 802.11 networks.

Contrary to MU downlink OFDMA wherein the AP can directly send multiple data to multiple nodes, a trigger mechanism has been adopted for the AP to trigger MU uplink communications from various nodes.

To support a MU uplink transmission (during a TxOP reserved by the AP), the 802.11ax AP has to provide signalling information for both legacy nodes (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 5:
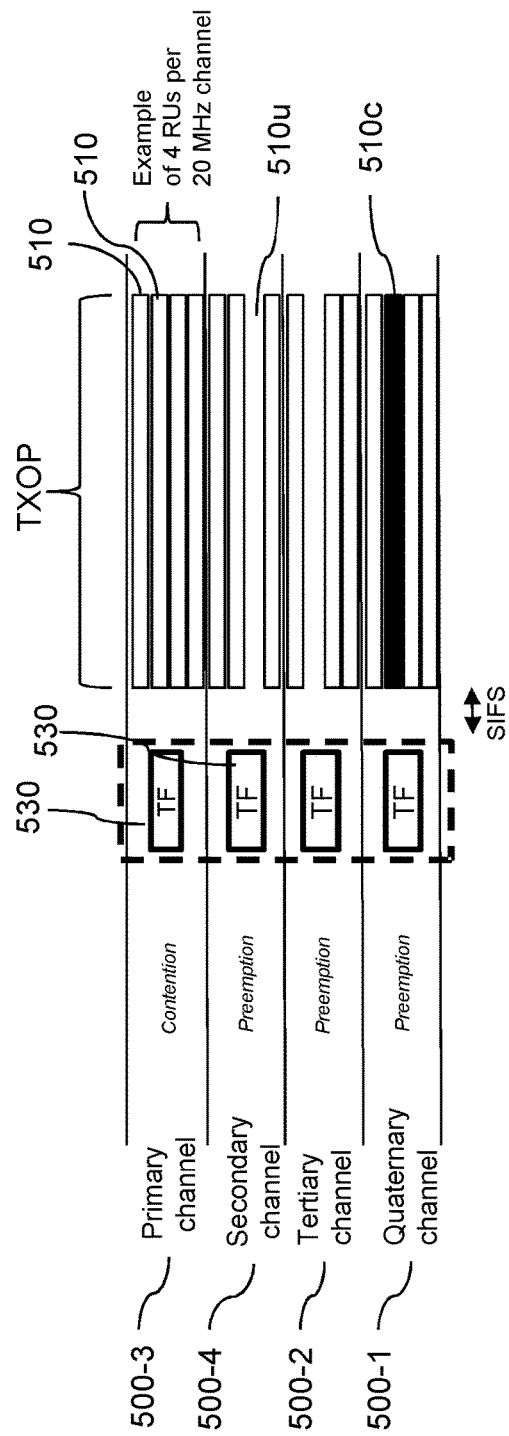
FIG. 5 illustrates an example of 802.11ax uplink OFDMA transmission scheme, wherein the AP issues a Trigger Frame for reserving a transmission opportunity of OFDMA subchannels (resource units) on an 80 MHz channel as known in the art.

As shown in the example of FIG. 5, the AP sends a trigger frame (TF) 530 to the targeted 802.11ax nodes. The bandwidth or width of the targeted composite channel is signalled in the TF frame, meaning that the 20, 40, 80 or 160 MHz value is signalled. The TF frame is sent over the primary 20 MHz channel 500-3 and duplicated (replicated) on each other 20 MHz channel forming the targeted composite channel, e.g. channels 500-1, 500-2 and 500-4. As described above for the duplication of control frames, it is expected that every nearby legacy node (non-HT or 802.11ac nodes) receiving the TF frame (or a duplicate thereof) on its primary channel, then sets its NAV to the value specified in the TF frame. This prevents these legacy nodes from accessing the channels of the targeted composite channel during the TXOP.

Based on an AP's decision, the trigger frame TF may define a plurality of resource units (RUs) 510 which can be randomly accessed by the nodes of the network (referred to as "Random RUs"). In other words, Random RUs designated or allocated by the AP in the TF may serve as basis for contention between nodes willing to access the communication medium for sending data. A collision occurs when two or more nodes attempt to transmit at the same time over the same RU.

In that case, the trigger frame is referred to as a trigger frame for random access (TF-R). A TF-R may be emitted by the AP to allow multiple nodes to perform MU UL (Multi-User UpLink) random access to obtain an RU for their UL transmissions.

The trigger frame TF may also designate scheduled resource units, in addition to or in replacement of the Random RUs. Scheduled RUs may be reserved by the AP for certain nodes in which case no contention for accessing such RUs is needed for these nodes. Such RUs and their corresponding scheduled nodes are indicated in the trigger frame. For instance, a node identifier, such as the Association ID (AID) assigned to each node upon registration, is added, in the TF frame, in association with each Scheduled RU in order to explicitly indicate the node that is allowed to use each Scheduled RU.

An AID equal to 0 may be used to identify random RUs.

The multi-user feature of OFDMA allows the AP to assign different RUs to different nodes in order to increase competition. This may help to reduce contention and collisions inside 802.11 networks.

In the example of FIG. 5, each 20 MHz channel (500-1, 500-2, 500-3 and 500-4) is sub-divided in the frequency domain into four sub-channels or RUs 510, typically of size 5 Mhz.

Of course the number of RUs splitting a 20 MHz channel may be different from four. For instance, between two to nine RUs may be provided (thus each having a size between 10 MHz and about 2 MHz).

Once the nodes have used the RUs to transmit data to the AP, the AP responds with an acknowledgment ACK (not show in the Figure) to acknowledge the data on each RU, making it possible for each node to know when its data transmission is successful (reception of the ACK) or not (no ACK after expiry of a time-out).

As shown in FIG. 5, some Resource Units may not be used (e.g. 510$u$) because no node has randomly selected one of these random RUs, whereas some others have collided (e.g. 510$c$) because two of these nodes have randomly selected the same RU.

The MU Uplink (UL) medium access scheme, including both scheduled RUs and random RUs, proves to be very efficient compared to conventional EDCA access scheme. This is because the number of collisions generated by simultaneous medium access attempts and the overhead due to the medium access are both reduced.

However, upon successfully transmitting data in a resource unit, RU, reserved by the AP, the AC queue from which data is transmitted is set in a MU EDCA mode for a predetermined duration counted down by a timer (noted HEMUEDCATimer[AC] below, standing for High Efficiency Multi-User EDCA Timer), in which the EDCA parameters are set to values, referred to as MU EDCA parameters values or MU values, different from legacy values used in a legacy or Single User (SU) EDCA mode. The MU EDCA parameters provide a reduced probability of SU EDCA medium access (which may be up to forbid SU EDCA access), and the direct link mode is based on the sending of packet in SU EDCA mode.

Under these circumstances, it is not recommended (case of a strong degradation of the SU EDCA medium access probability) and even not possible (case of the interdiction of the SU EDCA access for a file in MU EDCA mode) to transmit data in direct link mode (i.e. between peer-stations) from an AC queue as long as the AC queue is in MU EDCA mode.

In addition, the data in direct link mode cannot be sent in MU UL OFDMA, since those data are not addressed to the AP.

There is thus a need to ensure the coexistence between the direct link and the Multi user uplink mechanism, in particular because the direct link and MU UL share the same set of AC queues.

Figure 9B:
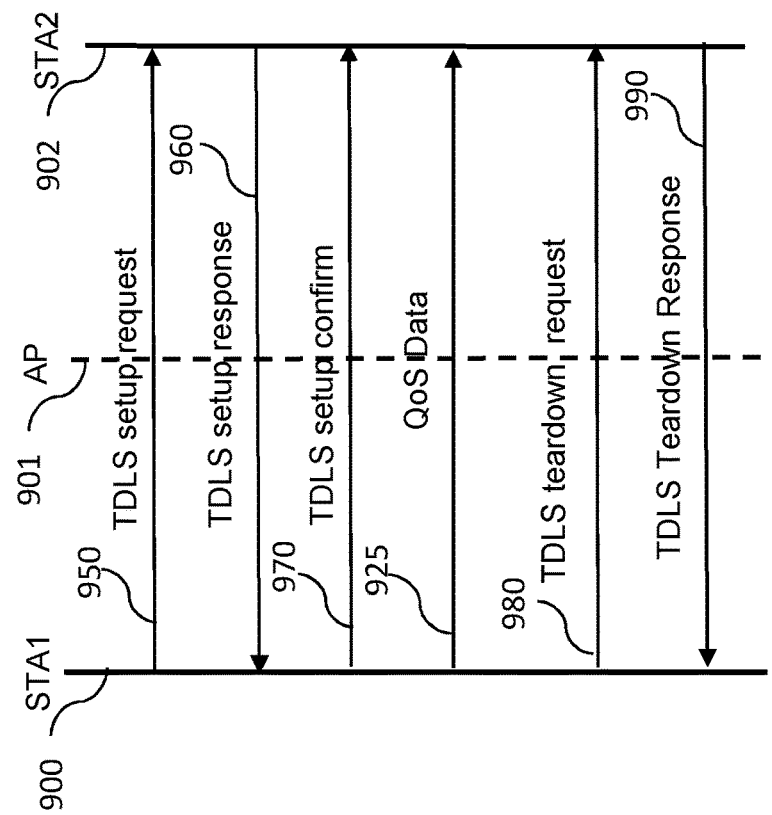
FIG. 9b illustrates using a sequence diagram, the tunneled direct link setup procedure.
Figure 9A:
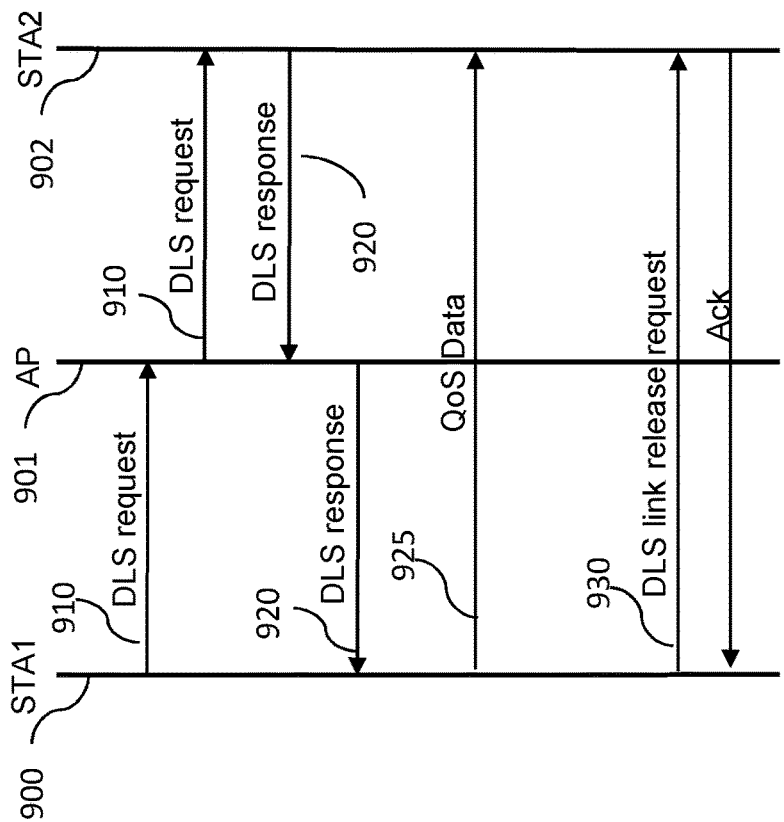
FIG. 9a illustrates, using a sequence diagram, the frame exchange procedure used during the setup of the Direct Link between two stations.

FIG. 9*a* illustrates, using a sequence diagram, the frame exchange procedure used during the setup of the Direct Link between two stations as described in the IEEE 802.11e amendment of the 802.11 standard.

The direct link setup has been introduced to allow stations that belong to a same BSS, to directly exchange data frames without being relayed by the AP. The established direct link avoids emitting the same frame twice on the medium, and enhances the latency of communications between stations of a same BSS. This Direct link establishment mechanism is supported by the access point since all the establishment frames are relayed by the AP.

To initiate a direct link, the station 900 willing to initiate a direct link (STA1 in the following) with another station 902 of the BSS (STA2 in the following), sends a DLS request 910 to STA2. In infrastructure mode, this frame is firstly received by the AP 901, then forwarded by the AP 901 to the final destination 902 (STA2). Upon reception of the DLS Request 910, if STA2 agrees, STA2 sends a DLS response 920 to STA1 via the AP.

Then, STA1 and STA2 can exchange frames (for instance QoS Data frame 925) directly without being forwarded by the AP.

At the end of the communication, a DLS link release request frame 930 is send by the station willing to finish the communication. The station receiving the DLS link release request 930 will acknowledge this frame.

FIG. 9*b* illustrates using a sequence diagram, the tunneled direct link setup procedure as described in the 802.11z amendment of the 802.11 standard, and the associated teardown procedure. The tunneled direct link is a modification of the direct link setup procedure, during which the AP has no role, and is not informed of the established direct link.

Then, classical TDLS setup procedure occurs. STA1 sends a TDLS setup request frame 950 to STA2. If STA2 agree, STA2 send a TDLS setup response 960 indicating an acceptance of the TDLS procedure. Upon reception of a positive TDLS setup response (response containing an acceptance by the STA2), STA1 sends back a TDLS confirm frame 970 to STA2. Then the Tunneled direct link is established, and the stations can exchange direct frames like for instance the QoS Data frame 925.

At the end of the Tunneled direct link session, the station willing to close the session, sends a TDLS Teardown request 980. The station receiving this TDLS teardown request 980, responses with a TDLS Teardown Response 990.

Figure 6:
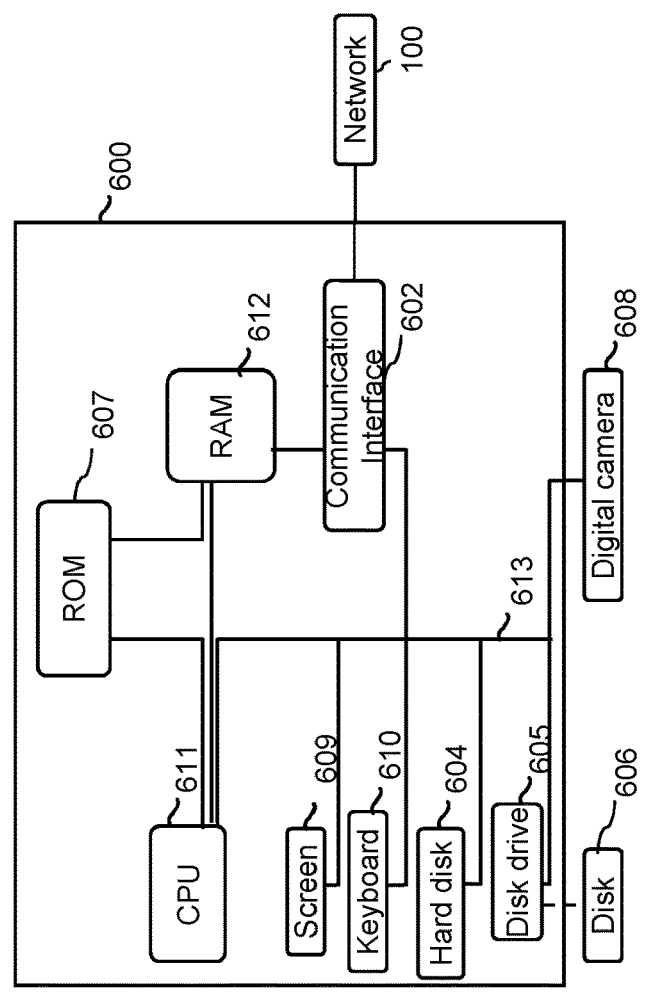
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device.

The communication device 600 comprises a communication bus 613 to which there are preferably connected:
- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:
- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to embodiments of the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
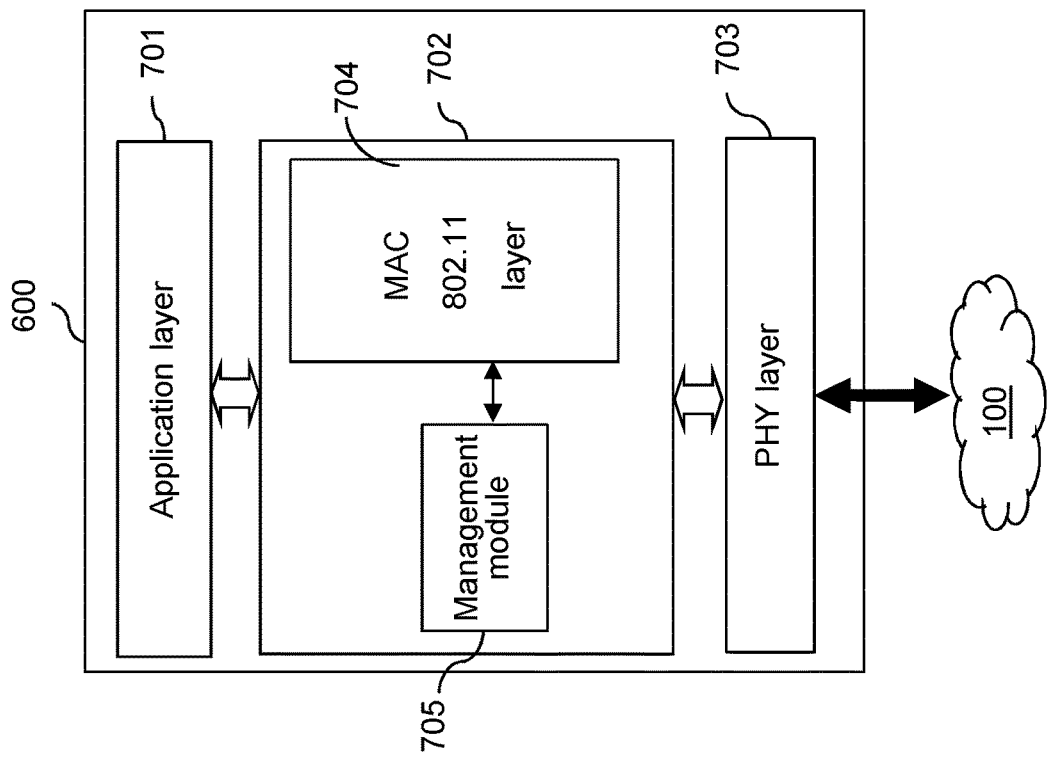
FIG. 7 shows a schematic representation of a wireless communication device in accordance with embodiments of the present invention.

FIG. 7 is a block diagram schematically illustrating the architecture of a communication device or node 600, in particular one of nodes 100-107, adapted to carry out, at least partially, the invention. As illustrated, node 600 comprises a physical (PHY) layer block 703, a MAC layer block 702, and an application layer block 701.

The PHY layer block 703 (here an 802.11 standardized PHY layer) has the task of formatting frames, modulating frames on or demodulating frames from any 20 MHz channel or the composite channel, and thus sending or receiving frames over the radio medium used 100. The frames may be 802.11 frames, for instance medium access trigger frames TF 530 to define resource units in a granted transmission opportunity, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and a management module 705 for carrying out, at least partially, embodiments of the invention. The MAC layer block 702 may optionally be implemented in software, which software is loaded into RAM 612 and executed by CPU 611.

MAC 802.11 layer 704 and management module 705 interact one with the other in order to provide management of the channel access module handling the queue backoff engines and a RU access module handling the RU backoff engine as described below.

On top of the Figure, application layer block 701 runs an application that generates and receives data packets, for example data packets of a video stream. Application layer block 701 represents all the stack layers above MAC layer according to ISO standardization.

Aspects of the present invention are now illustrated using various exemplary embodiments. Although the proposed examples use a centralized environment (i.e. with an AP), equivalent mechanisms can be used in an ad-hoc environment (i.e. without an AP). It means that the operations described below with reference to the AP may be performed by any node in an ad-hoc environment.

These embodiments are mainly described in the context of IEEE 802.11ax by considering OFDMA resource units. Application of the invention is however not limited to the IEEE 802.11ax context.

Also the present invention does not necessarily rely on the usage of a MU access scheme as described in 802.11ax. Any other RU access scheme defining alternate medium access schemes allowing simultaneous access by the nodes to the same medium can also be used.

Handling of Direct Link Traffic at a Station

According to a first aspect of the invention, there are provided methods for queueing MAC data frames into AC queues of a station.

Figure 10B:
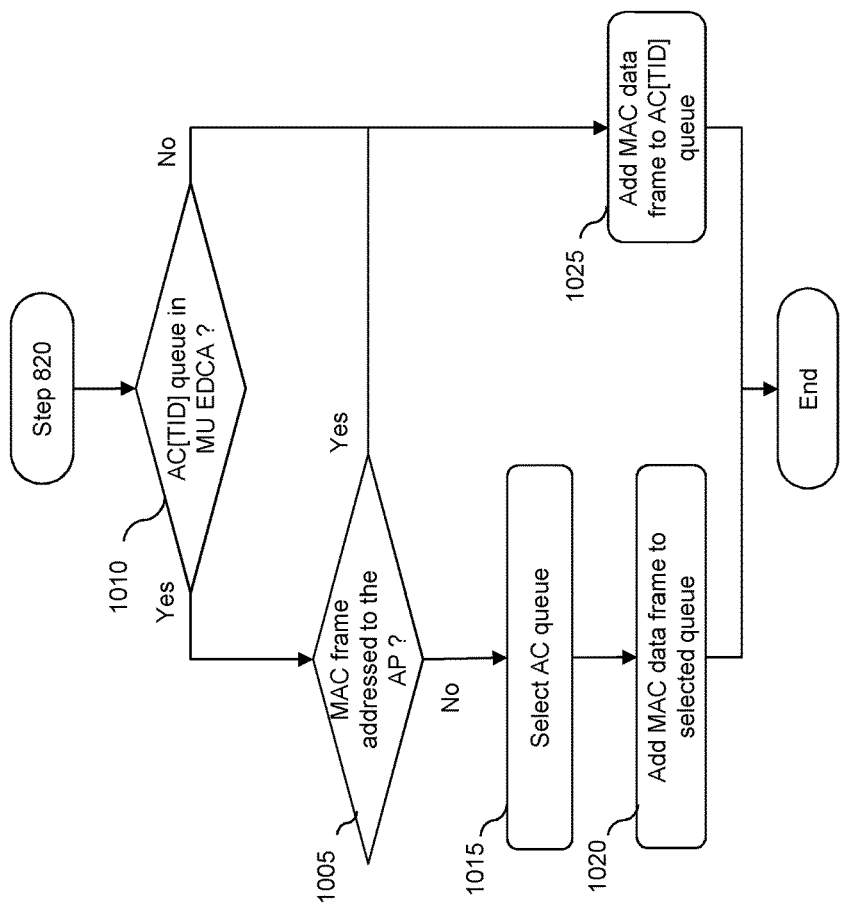
FIGS. 10a and 10b illustrate, using flowcharts, two variants of a first embodiment according to the first aspect of the invention for the queuing mechanism.
Figure 10A:
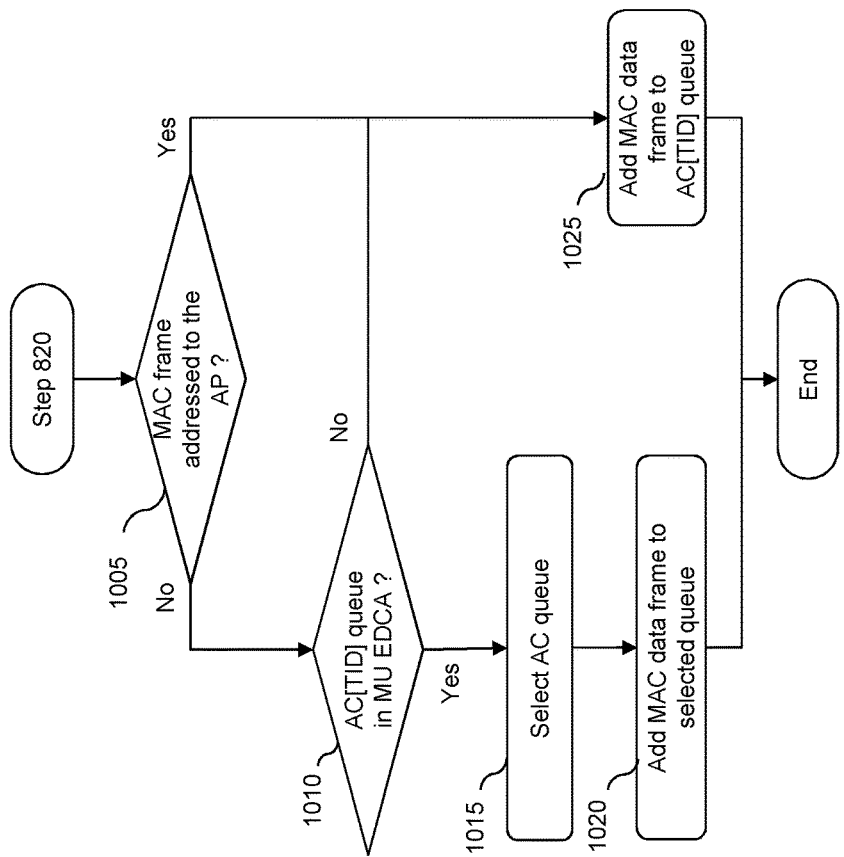

FIGS. 10a and 10b illustrate, using flowcharts, two variants of a first embodiment according to the first aspect of the invention for the queuing mechanism.

The illustrated flowcharts follow the step 820 of a conventional queuing process (cf. FIG. 8a), i.e. after a MSDU received from the upper layer is encapsulated into a MAC data frame (all necessary MAC frame headers have been added). Of course this is only one exemplary embodiment, and the flowchart (namely steps 1005, 1010 and 1015) may be executed, in other implementation variants, in parallel, before or as being part of the step of constructing the MAC data frame 820, after obtaining the MSDU from the upper layer (step 810).

Referring to FIG. 10a, at step 1005, it is checked whether the MAC data frame is addressed to the AP or not. This may be performed by comparing the Receiver Address (RA) of the MAC data frame against the address of the AP to which the STA is registered, or by checking if the subfield ToDS of the control frame 1530 is set to 1. The Receiver Address (RA) is located, for example, in address 1 field of a MAC data frame (illustrated in FIG. 16 by reference 1621) corresponding to a 48-bit IEEE MAC identifier that identifies the next immediate recipient of the frame. Alternatively, if step 1005 is executed before or in parallel of the construction of the MAC data frame, the comparison may be performed based on the information provided by the upper layer and used for determining the next recipient address to be included in the MAC data frame address 1 field. More generally, step 1005 may be performed by checking any variable indicating if the MAC data frame is to be transmitted in uplink mode (i.e. the MAC data frame is addressed to the AP), or in direct link mode (i.e. the MAC data frame is not addressed to the AP).

If the MAC data frame is addressed to the AP (test 1005 positive), the MAC data frame is added, at step 1025, to the AC queue corresponding to the TID of the MAC frame (referred to as target AC hereinafter), equivalently to step 830.

If it is determined that the MAC data frame is not addressed to the AP (test 1005 negative), which means that the MAC data frame is to be transmitted to another station in direct link, a further test 1010 is performed to determine if the AC queue corresponding to the TID of the MAC frame (AC[TID] or target AC) is in MU EDCA mode. Step 1010 may be performed by checking the value of HEMUEDCA-Timer for that AC queue. If this value is equal to 0, the queue is in (SU) EDCA mode, otherwise, the queue is in MU EDCA mode.

If the AC queue is not in MU EDCA mode, the MAC data frame is added to the target AC queue (step 1025), otherwise, a selection of an AC queue is performed (step 1015). The selection of an AC queue may preferably lead to the selection of another AC queue than the target AC queue, but it may still happen that the target AC queue is selected again. The selection of the AC queue may preferably be done by selecting:

a queue in EDCA mode (i.e. not in MU EDCA mode) with lower or immediately lower priority (lower AC value than the target AC value), in order to be able to transmit in direct link mode without taking precedence over data traffic with actually higher priority from other AC queues; or a queue in EDCA mode (i.e. not in MU EDCA mode) with any priority, for example in case no queue in EDCA mode with lower priority is available;

queue in EDCA mode with the immediate higher EDCA parameters values (lower priority) by considering the effective priorities of the queues by checking the current values of the EDCA parameters (and especially the AIFSN value conditioning the priority arbitration between stations).

If no queue in EDCA mode is available for selection, a queue in MU EDCA mode may still be selected to queue the MAC Data frame. In this case, the target AC queue is preferably selected (i.e. AC[TID]). Alternatively, the MAC data frame may be withdrawn.

It is to be noted that if the MAC data frame is queued in an AC queue that is in MU EDCA mode, other methods may be used, in combination or alternatively, to ensure the coexistence with the direct link mode, as it will be described later, e.g. execution of step 1115 in embodiment of FIG. 11a or 11b.

The flowchart of FIG. 10a starts by checking the MAC Frame RA field (step 1005). This is advantageous as usually the majority of the traffic of the STA is addressed to the AP. Better processing speed is achieved.

However a variant of the first embodiment may still be implemented as illustrated in FIG. 10b. In this variant, step 1010 is executed first and if the target AC queue (AC[TID]) is determined to be in MU EDCA mode (test 1010 positive), then it is checked at step 1005 whether the MAC data frame (or the corresponding MSDU) is addressed to the AP. The remaining steps are executed similarly to the flowchart of FIG. 10a. This variant is advantageous when the majority of the traffic queues are in EDCA mode (MU EDCA timers=0). Better processing speed is thus achieved.

The first embodiment illustrated in FIG. 10a and its variant illustrated in FIG. 10b, have the advantage to keep transmitting the traffic in direct link, i.e. not rerouting the data traffic via the AP (RA address not changed in the MAC data frame), and thus the transmission latency is not degraded and bandwidth is saved (rerouting via the AP roughly doubles the bandwidth required for transporting the data traffic).

Figure 11B:
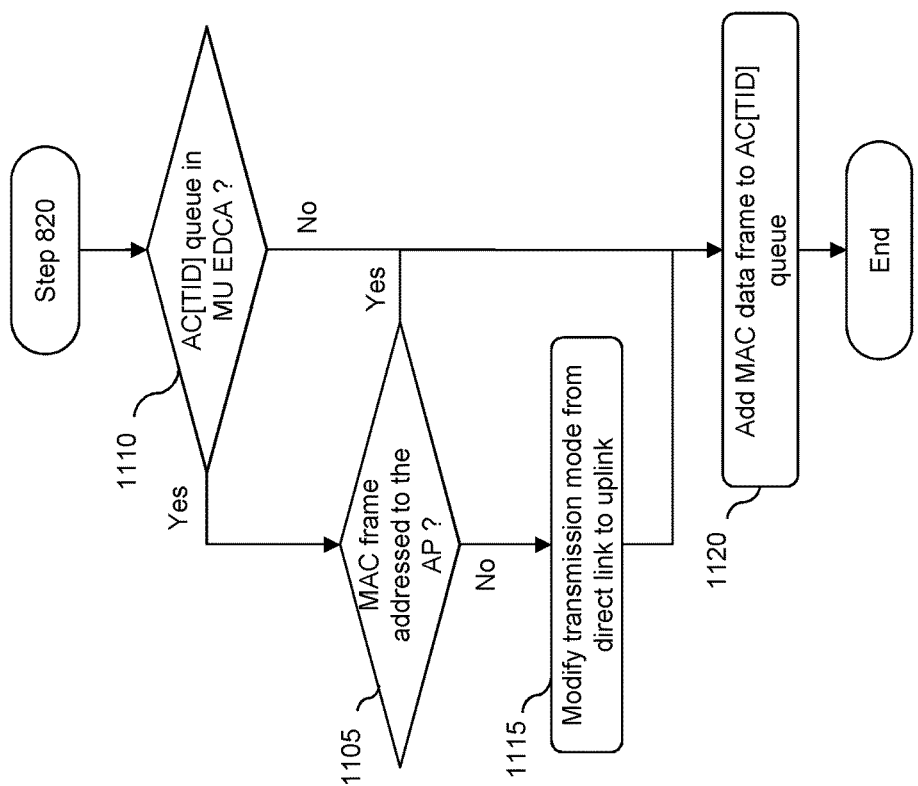
FIGS. 11a and 11b illustrate, using flowcharts, two variants of a second embodiment according to the first aspect of the invention for the queuing mechanism.
Figure 11A:
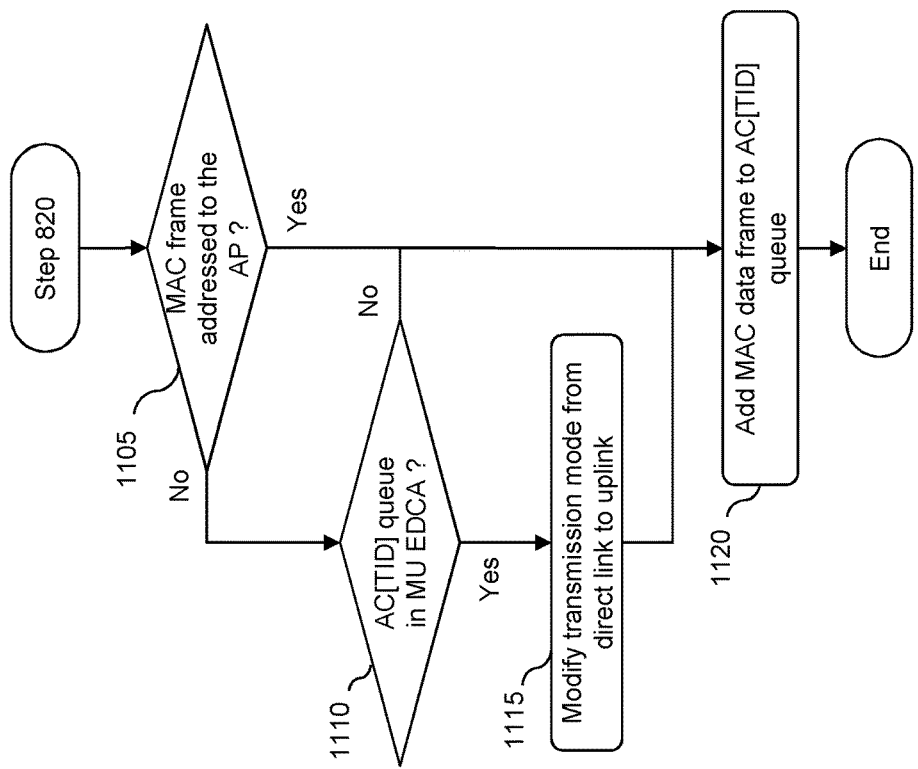

FIGS. 11a and 11b illustrate, using flowcharts, two variants of a second embodiment according to the first aspect of the invention for the queuing mechanism.

Similarly to FIGS. 10a and 10b, the illustrated flowcharts follow step 820 of a conventional queuing process, i.e. after a MSDU received from the upper layer is encapsulated into a MAC data frame. Alternatively, the flowcharts (namely steps 1105, 1110 and 1115) are executed in parallel, before or as being part of the step of constructing the MAC data frame 820, after obtaining the MSDU from the upper layer (step 810).

Referring to FIG. 11a, at step 1105, it is checked whether the MAC data frame is addressed to the AP or not. Implementation variants of this step may be similar to those of step 1005.

If the MAC data frame is addressed to the AP (test 1105 positive), the MAC data frame is added, at step 1120, to the target AC queue corresponding to the TID of the MAC frame, equivalently to step 830.

If it is determined that the MAC data frame is not addressed to the AP (test 1105 negative), which means that the MAC data frame is to be transmitted to another station in direct link, a further test 1110 is performed to determine if the AC queue corresponding to the TID of the MAC frame (AC[TID] or target AC) is in MU EDCA mode. Step 1110 may be performed by checking the value of the MU-EDCA TIMER. If this value is equal to 0, the queue is in (SU) EDCA mode, otherwise, the queue is in MU EDCA mode.

If the AC queue is not in MU EDCA mode, the MAC data frame is added to the target AC queue (step 1120), otherwise, the transmission mode of the MAC data frame is modified (step 1115). Typically, the transmission mode of the MAC data frame is modified from Direct link to UL (transmission via the AP) to be compatible with the MU EDCA mode of the target AC. Modifying the transmission mode may be performed for example by changing the Receiver Address in the address 1 field 1621, of the MAC Frame illustrated in FIG. 16) identifying the next immediate recipient of the frame from the address of the destination peer-station to the address of the AP to which the transmitting STA is registered to and by setting the address of the destination peer-station in the Destination Address (DA) in the address 3 (field 1623) corresponding to a 48-bit IEEE MAC identifier that identifies the final recipient. In addition, the ToDS subfield (indicating that the frame is Uplink Link: sent from a Station to the AP) of the Control Frame field 1630 of the MAC Header 1610 is set to 1. In a variant, the FromDS subfield (indicating that the frame is Downlink: sent from the AP to the Station) of the Control Frame field 1630 of the MAC Header 1610 is also set to 1. This means that the two subfields FromDS and ToDS are set to 1.

Changing the transmission mode, an in particular the addresses and ToDS field, results in redirecting the MAC data frame towards the AP so that the AP relays the MAC data frame to the final destination station.

Changing the transmission mode from direct link to UL makes it possible to use MU UL trigger based PPDU for transmitting the MAC data frame, and avoids blocking transmission of other MAC data frames present in the AC queue.

The flowchart of FIG. 11a starts by checking the MAC Frame RA in the address 1 field 1621 (step 1105), or by checking the Field ToDS of the Control Frame 1630. This is advantageous as usually the majority of the traffic of the STA is addressed to the AP. Better processing speed is achieved.

However a variant of the second embodiment may still be implemented as illustrated in FIG. 11b. In this variant, step 1110 is executed first and if the target AC queue (AC[TID]) is determined to be in MU EDCA mode (test 1110 positive), then it is checked at step 1105 whether the MAC data frame (or the corresponding MSDU) is addressed to the AP. The remaining steps are executed similarly to the flowchart of FIG. 11a. This variant is advantageous when the majority of the traffic queues are in EDCA mode (MU EDCA timers=0). Better processing speed is thus achieved.

The second embodiment illustrated in FIG. 11a and its variant illustrated in FIG. 11b, have the advantage to maintain the QoS by not changing the priority of the MAC data frame. Furthermore, this second embodiment is not dependent on the existence or not of an AC queue in (SU) EDCA mode.

First and second embodiments advantageously avoid, at the phase of queuing MAC data frames in AC queues, situations where an AC queue in MU EDCA mode contains MAC data frames that are not addressed to the AP, and thus prevent blocking an AC queue because the next to be transmitted MAC data frame is not in the appropriate transmission mode and cannot be transmitted. It is recalled that the AC queue from which data is transmitted in MU UL is set in a MU EDCA mode for a HEMUEDCATimer duration, which is reset each time a new MAC data frame is transmitted in MU UL.

However, it may still happen that an AC queue contains MAC data frames that are to be transmitted in different transmission modes, such as MU UL EDCA and Direct link. This situation may occur after the mode of an AC queue is changed, for example to MU EDCA while already containing MAC data frames not addressed for the AP. This situation may also occur if there is no AC queue in EDCA mode (i.e. all AC queues are in MU EDCA mode) and the MAC data frame to be transmitted in direct link mode should not be discarded. The MAC data frame is then added to an AC queue in MU EDCA mode as discussed above with regards to the first embodiment.

The invention in its second aspect provides methods for handling the transmission of MAC data frames (de-queuing), particularly when an AC queue in MU EDCA mode contains a MAC data frame not addressed for the AP already.

Transmission of MAC Data Frames from AC Queues

According to the second aspect of the invention, there are provided methods for transmitting MAC data frames from AC queues of a station.

Figure 12B:
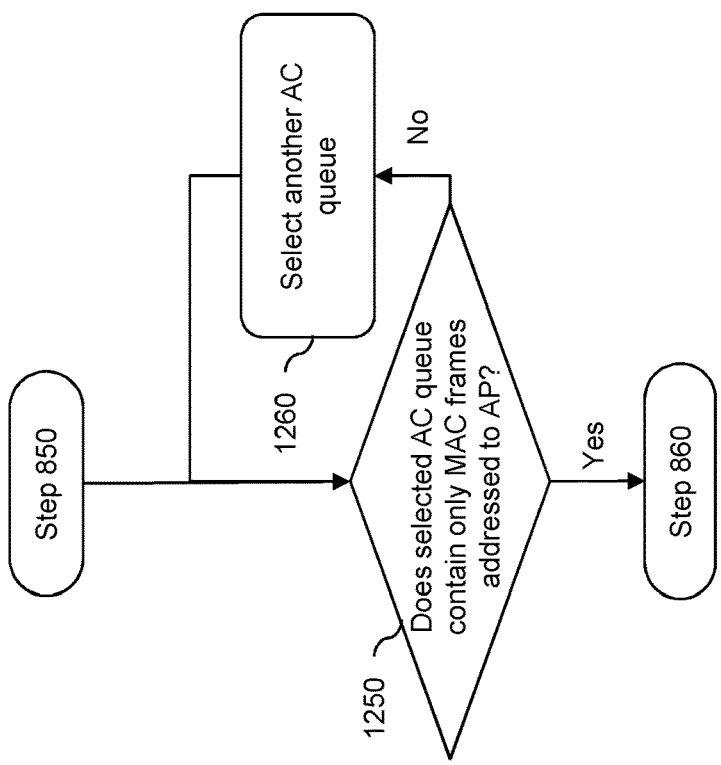
FIG. 12b illustrates, using a flowchart, a second embodiment according to the second aspect of the invention.
Figure 12A:
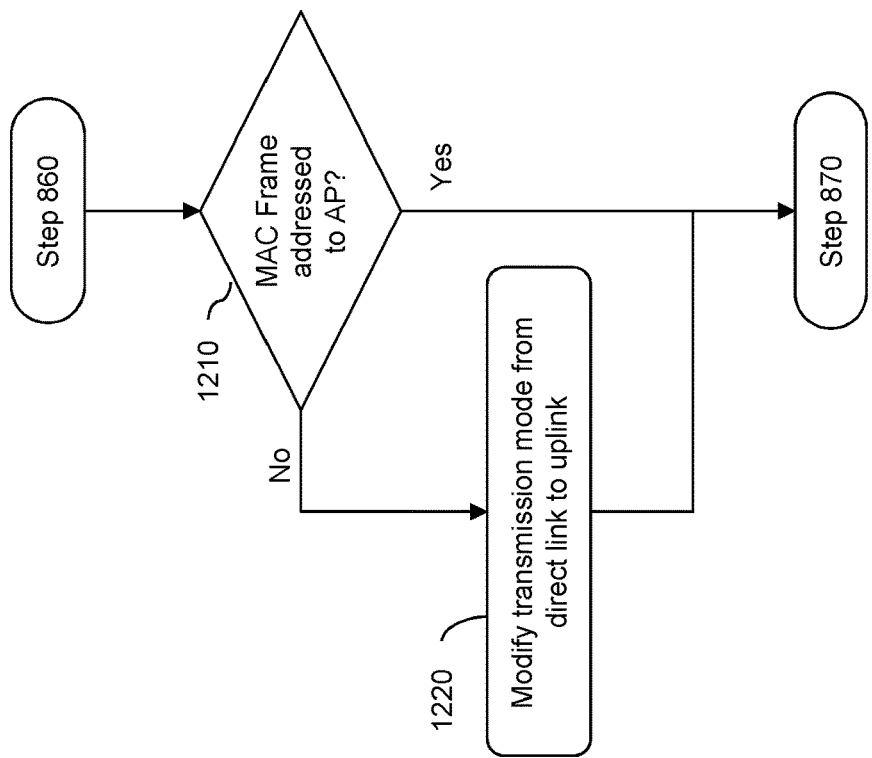
FIG. 12a illustrates, using a flowchart, a first embodiment according to the second aspect of the invention.

FIG. 12a illustrates, using a flowchart, a first embodiment according to the second aspect of the invention.

The illustrated flowchart may follow step 860 of FIG. 8b, i.e. a MAC data frame is selected for transmission. It is assumed that the station has been granted a resource unit (RU) defined in a trigger frame received from the AP for sending the MAC data frame in MU UL mode.

At step 1210, it is checked whether the MAC data frame selected for transmission is addressed to the AP or not. Implementation details and variants of step 1210 may be similar to the description of step 1005 of FIG. 10a (or 1115 of FIG. 11a) and will not be repeated here.

If the MAC data frame is addressed to the AP (test 1210 positive), the MAC data frame is transmitted in MU UL trigger based PPDU.

If it is determined that the MAC data frame is not addressed to the AP (test 1210 negative), which means that the MAC data frame is to be transmitted to another station in direct link, the transmission mode of the MAC data frame is modified (step 1220). The transmission mode of the MAC data frame is modified from Direct link to UL in order to be transmitted in a RU using a MU UL trigger based PPDU (step 870). Modifying the transmission mode may be performed for example by changing the Receiver Address (address 1 field 1621, of the MAC Frame illustrated in FIG. 16) identifying the next immediate recipient of the frame from the address of the destination peer-station to the address of the AP to which the transmitting STA is registered to and by setting the address of the destination peer-station in the Destination Address (DA) in the address 3 field 1623 corresponding to a 48-bit IEEE MAC identifier that identifies the final recipient. In addition, the ToDS subfield (indicating that the frame is Uplink Link: sent from a Station to the AP) of the Control Frame field 1630 of the MAC Header 1610 is set to 1. In a variant, the FromDS subfield (indicating that the frame is Downlink: sent from the AP to the Station) of the Control Frame field 1630 of the MAC Header 1610 is also set to 1. This means that the two subfields FromDS and ToDS are set to 1.

Changing the transmission mode, an in particular the addresses and subfields of the control frame 1530, results in redirecting the MAC data frame towards the AP so that the AP relays the MAC data frame to the final destination station.

Changing the transmission mode from direct link to UL makes it possible to use MU UL trigger based PPDU for transmitting the MAC data frame, and avoids blocking transmission of other MAC data frames present in the AC queue.

FIG. 12b illustrates, using a flowchart, a second embodiment according to the second aspect of the invention.

The illustrated flowchart may follow step 850 of FIG. 8b, i.e. an AC queue is selected from which a MAC data frame is to be transmitted. It is assumed that the station has been granted a resource unit (RU) defined in a trigger frame received from the AP for sending a MAC data frame in MU UL mode.

At step 1250, it is checked whether the selected AC queue contains MAC data frames addressed only to the AP. This step 1250 can be performed by analyzing the content of the queue and checking for example the RA fields of the MAC data frames stored therein, or the ToDS field value. The checking may also be performed by analyzing the RA or ToDS field of a MAC data frame at the time the MAC data frame is added to the queue, and maintaining a variable indicating whether the queue contains MAC data frames addressed only for the AP or not. The variable is then read to determine the result of the checking of step 1250.

If all MAC data frames contained in the queue are addressed to the AP, the process proceeds with the selection of MAC data frame from the queue for transmission in a MU UL trigger-based PPDU, similarly to step 860 of FIG. 8b for example. Thereby, a non-AP STA only sends QoS data frames in MU UL trigger-based PPDU with ACs for which the STA's buffer queues contain frames that are only addressed to its associated AP.

If not all MAC data frames contained in the queue are addressed to the AP, another AC queue is selected (step 1260) and the checking step 1250 is re-executed. Preferably, the newly selected AC queue is an AC queue with the next lower priority (as explained with reference to FIG. 2a).

Use of Status Buffer Reports

According to a third aspect of the invention, there are provided a method for transmitting a buffer status report by a station to the AP.

As discussed above, an AC queue from which data is transmitted in MU UL is set in a MU EDCA mode for a HEMUEDCATimer duration, which is reset each time a new MAC data frame is transmitted in MU UL. If the AC queue contains a MAC data frame not addressed to the AP, transmission of the MAC data frame in direct mode is blocked until the mode of the AC queue resumes back to legacy SU EDCA. The AC queue may thus be blocked for a long period of time which is problematic for performance and latency point of view.

In a first embodiment according to the third aspect of the invention, there is provided a mechanism to influence the scheduling by the AP of RUs for a given AC queue of a station. Consequently, if no more RUs are provided for a station to send data in MU UL, the station has no more opportunity to send data MU UL trigger based PPDU and the HEMUEDCATimer is not (re)set. Time to resume SU EDCA mode for the given AC queue (after the timer expiry) is thus reduced.

The first embodiment relies on the use of a mechanism of buffer status report (BSR) for a station to report to the access point the amount and TID of data held in AC queues ready to be transmitted to the access point. The AP uses received BSR to support an efficient uplink MU operation. For example, once the access point has obtained buffer reports for a set of stations, it can specifically poll them through scheduled resource unit allocation. This allocation is transmitted using a trigger frame for data transmission. Then, the stations with allocated resource units emit their buffered data inside their allocated resource units.

Figure 13A:
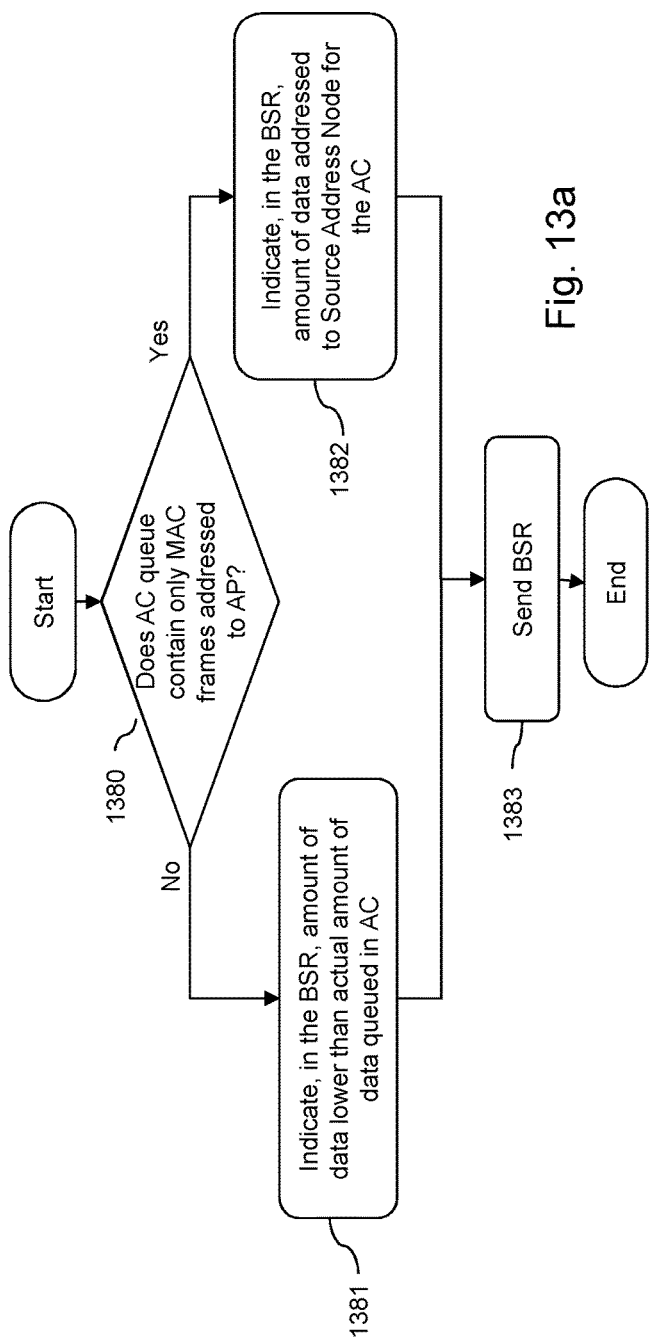
FIG. 13a illustrates, using a flowchart, a first embodiment according to the third aspect of the invention.

FIG. 13a illustrates, using a flowchart, a first embodiment according to the third aspect of the invention.

The flowchart is executed by a station when preparing a BSR (or QoS control field as described in FIG. 13b) for a given AC. The BSR may be used by the AP to schedule the stations to be polled by a trigger frame. If one of the AC queue of a station is in MU EDCA mode and contains a MAC data frame not addressed to the AP, it is preferable for the station to quickly resume the legacy SU EDCA mode to unblock the AC queue and to send the MAC data frame in direct link mode.

At step 1380, it is determined if the selected AC (AC for which the station prepares a BSR or QoS control field) contains only data addressed to the AP.

If not all MAC data frames queued in the AC queue are addressed to the AP, step 1381 is executed, otherwise step 1382 is executed.

At step 1381, an amount of data that is different from the actual amount of data in the AC queue is reported to the AP in a BSR. For example, the station may report in the BSR that there is no data in the AC queue (quantity of data, e.g. queue size 1393 in the QoS control field 1391 of FIG. 13b, set to 0) to indicate to the AP that the station doesn't need to be polled, regardless of the real content of the AC queue. Then step 1383 is executed.

At step 1382, the station may report in the BSR the actual amount of data stored in the AC queue addressed to the station or AP that will receive the QoS control field or BSR.

At step 1383, the QoS control field or BSR is inserted in the frame to be transmitted.

The advantage of the proposed embodiment is to speed up the return to the EDCA mode for a AC queue in MU EDCA mode by indicating to the AP that the station doesn't have any data (or lower amount than actual amount of data) in the AC queue (step 1381), so that the AP will not trigger the station.

Figure 13B:
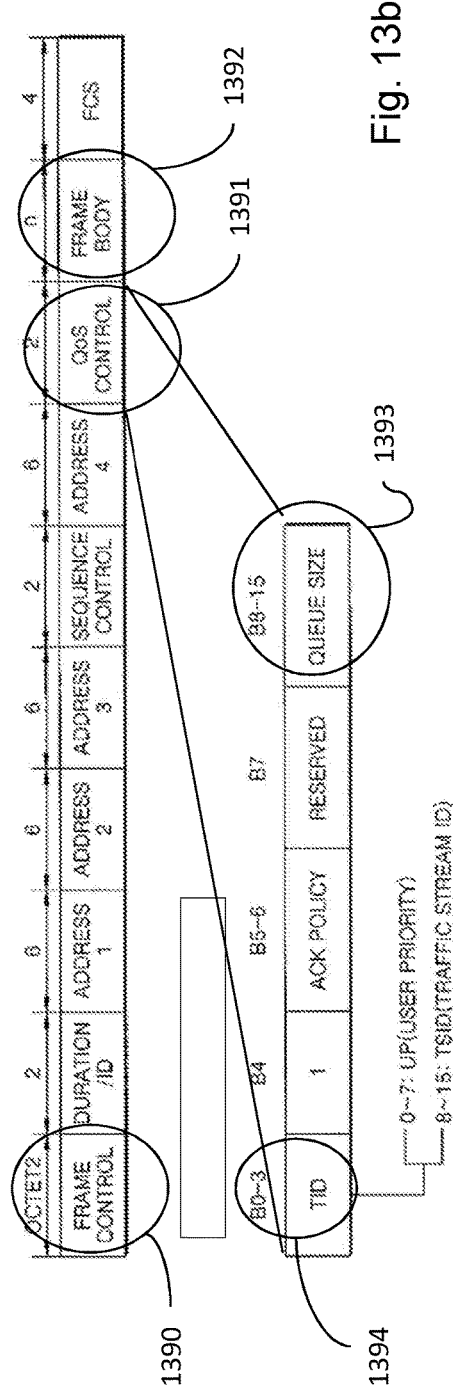
FIG. 13b illustrates as an example configurations of a MAC data frame and a QoS control field included in the header of the IEEE 802.11e MAC frame.

FIG. 13b illustrates as an example configurations of a MAC data frame and a QoS control field 1391 included in the header of the IEEE 802.11e MAC frame. The MAC data frame also includes, among other fields, a Frame Control header 1390 and a frame body 1392. As represented in the Figure, the QoS control field 1391 is made of two bytes, including the following information items:

Bits B0 to B3 are used to store a traffic identifier (TID) 1394 which identifies a traffic stream. The traffic identifier takes the value of the transmission priority value (User Priority UP, value between 0 and 7—see FIG. 3b) corresponding to the data conveyed by the data frame or takes the value of a traffic stream identifier, TSID, value between 8 and 15, for other data streams;

Bit B4 is used by a non-AP station to differentiate the meaning of bits B8-B15 and is detailed here below;

Bits B5 and B6 define the ACK policy subfield which specifies the acknowledgment policy associated with the data frame. This subfield is used to determine how the data frame has to be acknowledged by the receiving station; normal ACK, no ACK or Block ACK.

Bit B7 is reserved, meaning not used by the current 802.11 standards; and

If bit B4 is set to 1, bits B8-B15 represent the "queue size" subfield 1393, to indicate the amount of buffered traffic for a given TID at the non-AP station sending this frame. The queue size value is the total size, rounded up to the nearest multiple of 256 octets and expressed in units of 256 octets, of all packets buffered for the specified TID. The access point may use this information to determine the next TXOP duration it will grant to the station. A queue size of 0 indicates the absence of any buffered traffic for that TID. A queue size of 255 indicates an unspecified or unknown size for that TID 1394.

Alternatively to the "queue size" usage, if bit B4 is set to 0, bits B8-B15 represent the "TXOP Duration Requested" subfield. It indicates the duration, in units of 32 μs, that the sending station determines it needs for its next TXOP for the specified TID. Of course, the "TXOP Duration Requested" provides an equivalent request as the "queue size", as they both consider all packets buffered for the specified TID.

The 802.11e MAC frame format, and more particularly the QoS Control field 1391, have been kept for the up and coming standard versions. The following description will be done with "queue size" format for the buffer status reports, as it is the largest usage. Described embodiments remain applicable to the "TXOP Duration Requested" format.

Operation at the AP Side

According to a fourth aspect of the invention, there are provided a method for receiving MAC data frames at the Access Point.

Figure 14:
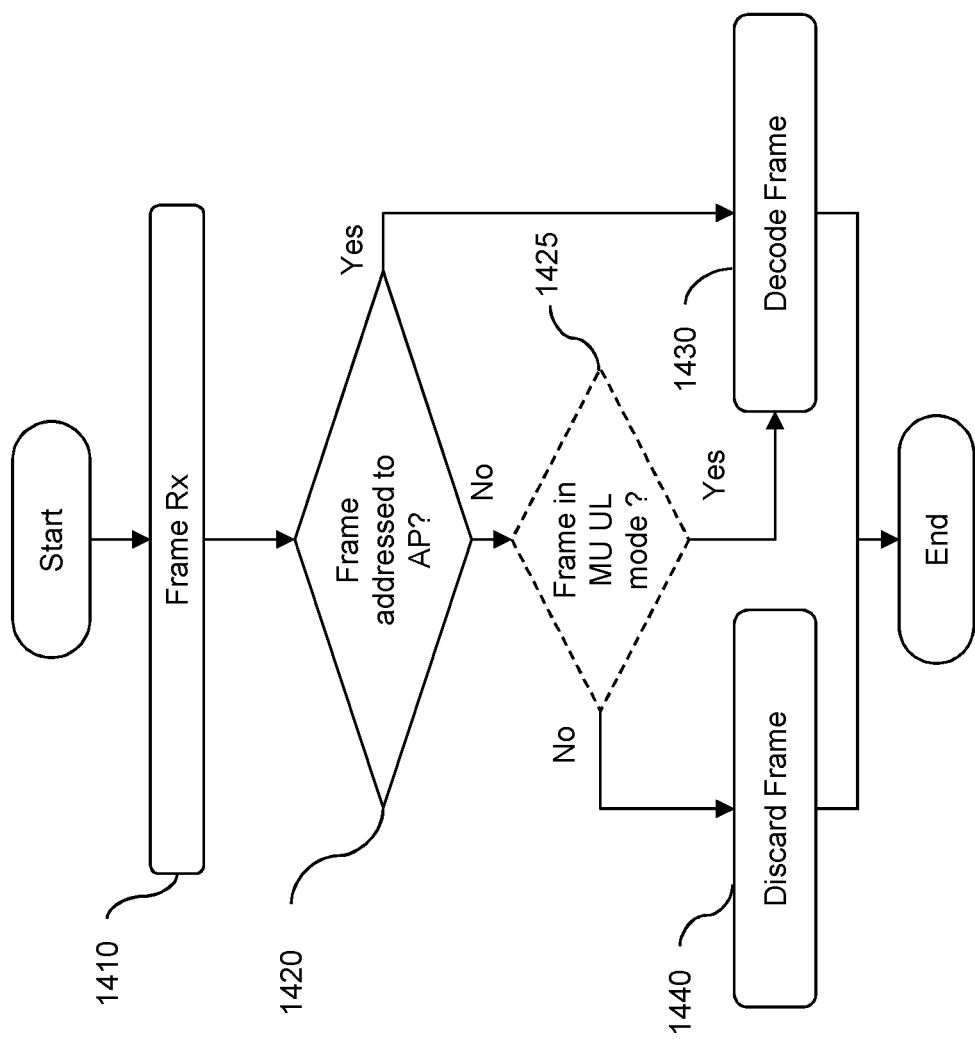
FIG. 14 illustrates, using a flowchart, a first embodiment according to the fourth aspect of the invention.

FIG. 14 illustrates, using a flowchart, a first embodiment according to the fourth aspect of the invention.

At step 1410, AP receives a MAC data frame at MAC level. The MAC header of the 802.11 data frame is decoded and in particular its address fields. The structure of the MAC header is illustrated with reference to FIG. 16.

At step 1420, it is checked whether the frame is addressed to AP. According to a first variant, it is checked whether the Receiver Address (RA) corresponds to the MAC address of the Access Point. If yes, the MAC data frame is decoded (step 1430). If the Receiver Address (RA) does not correspond to the MAC address of the Access Point, step 1425 is executed. According to a second variant, it is checked whether the FromDS subfield and ToDS subfield are both set to 1. If yes, the MAC data frame is decoded (step 1430), otherwise step 1425 is executed.

If the Receiver Address corresponds to the MAC address of the AP (test 1420 positive), the MAC data frame is decoded (step 1430) and delivered to upper layer for further processing.

If the Receiver Address does not correspond to the MAC address of the AP (test 1420 negative), it is checked at step 1425 whether the received frame has been transmitted via the MU UL access scheme or not. The checking step 1425 is optional and the flowchart of FIG. 14 may be executed by the AP while receiving MAC data frames in reserved RUs in MU UL.

If the received frame has not been transmitted via the MU UL access scheme, the MAC data frame is discarded at step 1440.

If the received frame has been transmitted via the MU UL access scheme, the MAC data frame is sent to the reception queue of the MAC layer for further processing. In fact, in this embodiment of the invention, transmitting a MAC data frame with an address of a non-AP station within a RU reserved by the AP for uplink is interpreted by the AP as an indication that the MAC data frame should be relayed to the addressed non-AP station. Considering this behavior, a station which is provided an opportunity to send a MAC data frame in MU UL from AC queue that is in MU EDCA mode is not blocked, and a MAC data frame addressed to a non-AP station (initially scheduled for direct link transmission), can still be transmitted to the AP in MU UL, the AP will then relay the MAC data frame to the addressed non-AP station.

As the AP has initiated the MU UL access scheme by granting a transmission opportunity TXOP during a given period, each frame received during this given period is considered as MU UL frame (independently of the Receiver Address). According to one implementation, a frame received outside a TXOP granted by the AP for MU UL access scheme is not considered as a MU UL frame.

At step 1440, the MAC data frame is discarded.

Figure 15:
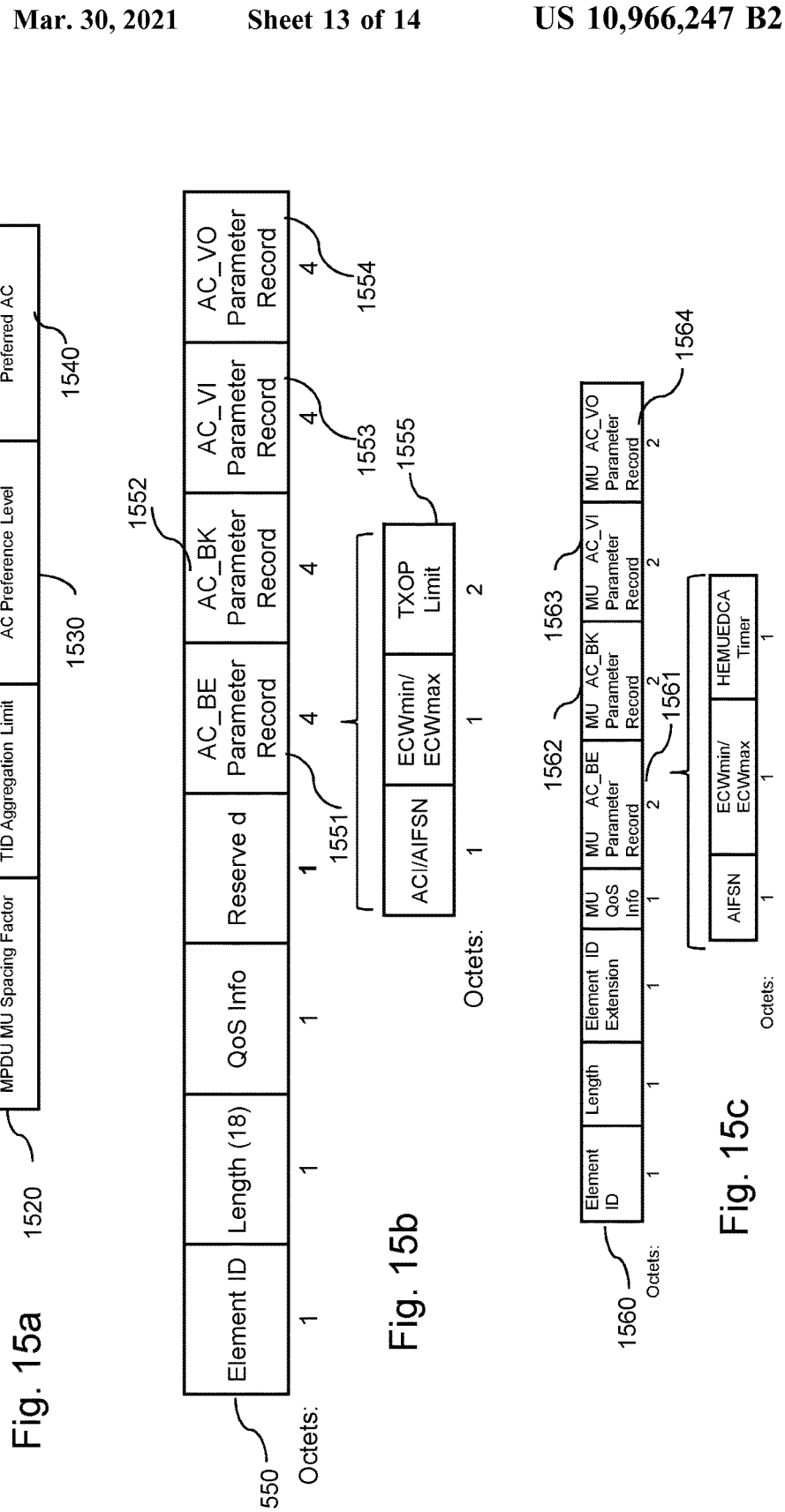
FIG. 15a illustrates the structure of a trigger frame according to an embodiment of the invention.
FIG. 15b illustrates the structure of a standardized information element used to describe the SU EDCA parameters of the EDCA in a beacon frame.
FIG. 15c illustrates an exemplary structure of a dedicated information element to transmit the MU EDCA parameters.

FIG. 15a illustrates the structure of a trigger frame according to an embodiment of the invention.

The trigger frame 1500 is composed of a dedicated field 1510 called User Info Field. This field contains a "Trigger dependent Common info" field 1520 which contains the "AC Preference Level" field 1530 and "Preferred AC" field 1540.

The Preferred AC field 1540 is a 2-bit field indicating the AC queue (value from 0 to 3) from which data should be sent by the node on the RU allocated to that node in the trigger frame.

The AC preference Level field 1530 is a bit indicating if the value of the Preferred AC field 1540 is meaningful or not. If the field 1530 is set to 1, then the node should take into account the preferred AC field 1540 when selecting the AC queue (e.g. at step 850 of FIG. 8b). If the field 1530 is set to 0, the node is allowed to send data from any AC queue, regardless of the preferred AC field 1540 value.

The other fields of the trigger frame are similar to what is defined in the 802.11ax standard.

The AP may also be in charge of broadcasting the EDCA parameters for both SU EDCA mode and MU EDCA mode. It preferably performs the broadcasting using a well-known beacon frame, dedicated to configure all the nodes in an 802.11 cell. Note the if the AP fails to broadcast the EDCA parameters, the nodes are configured to fall-back to by-default values as defined in the 802.11ax standard.

FIG. 15b illustrates the structure of a standardized information element 1550 used to describe the SU EDCA parameters of the EDCA in a beacon frame.

Fields 1551, 1552, 1553, 1554 describes the SU EDCA parameters associated with each traffic queue 210. For each traffic queue, a subfield 1555 includes the SU EDCA parameters: AIFSN as a delay before starting to decrease the associated backoff value, the ECWmin and ECWmax as the values of the minimum $CW_{min}$ and maximum $CW_{max}$ contention window and finally the TXOP limit as the maximum transmitting data time for an 802.11 device.

All the others fields of the information element are those described in the 802.11 standard.

FIG. 15c illustrates an exemplary structure of a dedicated information element 1560 to transmit the MU EDCA parameters corresponding to degraded EDCA parameter values, as well as the HEMUEDCATimer values. The dedicated information element 1560 may be included in a beacon frame sent by the AP.

The dedicated information element 1560 includes, for each AC queue, the MU EDCA parameters (1561,1562, 1563,1564) to be used by the nodes in the MU EDCA mode.

Each subfield 1561,1562,1563,1564 includes the degraded AIFSN value for the corresponding traffic queue, the degraded ECWmin value and degraded ECWmax value (they can be the same as the legacy EDCA values), as well as the value of the HEMUEDCATimer.

The degrading duration HEMUEDCATimer drives the nodes entering one of its AC the MU EDCA mode to maintain this AC in such mode at least the degrading duration.

Figure 16:
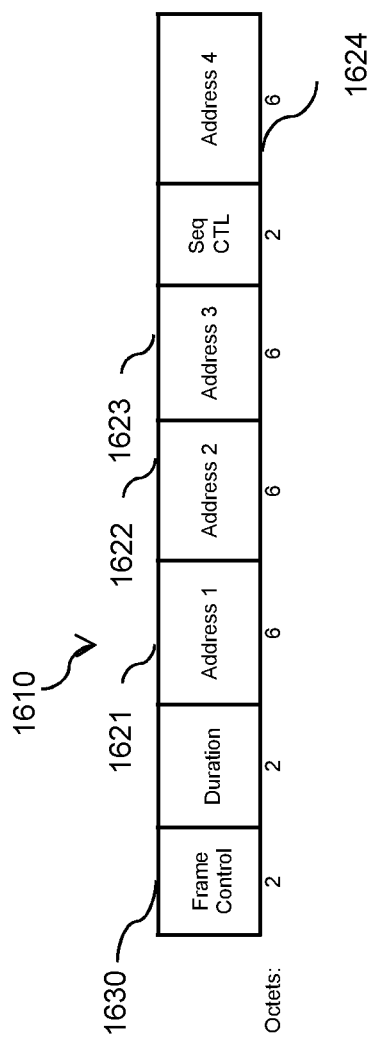
FIG. 16 illustrates a MAC header of a 802.11 data frame and in particular its four address fields.

FIG. 16 illustrates a MAC header of a 802.11 data frame and in particular its four address fields.

A MAC header 1610 may contain up to 4 address fields, a first address field 1621, referred to as address 1 field, a second address field 1622, referred to as address 2 field, a third address field 1623, referred to as address 3 field and a fourth address field 1624, referred to as address 4 field. The address fields are numbered because the content of an address field depends on the frame type. The different contents are the following. A Source Address (SA) corresponding to a 48-bit identifier that identifies the source of the transmission. A Destination Address (DA) corresponding to a 48-bit IEEE MAC identifier that identifies the final recipient. A Receiver Address (RA) corresponding to a 48-bit IEEE MAC identifier that identifies the next immediate recipient of the frame. In particular, in a frame involved in a direct link transmission, RA corresponds to the final recipient. In a frame involved in a non-direct link transmission, RA corresponds to the 48-bit IEEE MAC identifier of the Access Point. A Transmitter Address (RA) corresponding to a 48-bit IEEE MAC identifier that identifies the wireless interface that transmitted the frame onto the wireless medium. A Basic Set Service Set ID (BSSID) corresponding to a 48-bit identifier that identifies the Basic Service Set of the Access Point.

The number of address fields used and the content of each one depends mainly of the type of frame (management or control or data). But the general rules is that the address 1 field 1621 contains the content RA, the address 2 field 1622 contains the content TA and the address 3 field 1623, used for filtering by the receiver, contains either BSSID, SA and DA. Only the address 1 field 1621 (containing the content RA) is mandatory.

Many further modifications and variations will suggest themselves to those versed in the art upon making reference to the foregoing illustrative embodiments, which are given by way of example only and which are not addressed to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of queueing a data frame in one of a plurality of traffic queues at a communication station for transmission over a communication channel in a communication network comprising a plurality stations and an access point (AP), the method comprising:
   selecting a traffic queue based on at least one of:
      a transmission mode, direct link or uplink, of the data frame, and
      a transmission mode of the traffic queue; and
   queueing the data frame in the selected traffic queue;
   wherein:
   the transmission mode of the data frame is one of: a direct link mode if the data frame is to be addressed to a non-AP station, and an uplink mode if the data frame is to be addressed to the AP; and
   the transmission mode of the traffic queue is one of: a Multi-User (MU) uplink (UL) mode if a data frame previously stored in the traffic queue has been transmitted, since a predetermined period of time, in a resource unit (RU) provided by the AP within a transmission opportunity granted to the AP on the communication channel, and Single-User (SU) mode otherwise,
   wherein if the transmission mode of the data frame is direct link, the traffic queue in SU mode is selected for queueing the data frame,
   wherein the selected traffic queue is a SU mode traffic queue which priority is not greater than the priority of the data frame, and
   wherein the plurality of traffic queues are configured to serve data traffic at different priorities, and wherein the determined traffic queue in SU mode is a SU traffic queue which priority is not greater than the priority of the data frame.

2. The method of claim 1, wherein the plurality of traffic queues are configured to serve data traffic at different priorities, the method further comprising:
   determining a priority of the data frame; and
   determining a traffic queue based on the priority of the data frame.

3. The method of claim 2, wherein the determined traffic queue is the traffic queue which priority corresponds to the priority of the data frame.

4. The method of claim 2, wherein the determined traffic queue is selected for queueing the data frame if the transmission mode of the traffic queue is SU mode and the transmission mode of the data frame is uplink.

5. The method of claim 2, wherein a traffic queue in SU mode is selected for queueing the data frame if the transmission mode of the traffic queue is MU UL mode and the transmission mode of the data frame is direct link.

6. A non-transitory computer-readable medium storing a program which, when executed by a microprocessor or computer system in a device, causes the device to perform the following steps:
   selecting a traffic queue based on at least one of:
      a transmission mode, direct link or uplink, of the data frame, and
      a transmission mode of the traffic queue; and
   queueing the data frame in the selected traffic queue;
   wherein:
   the transmission mode of the data frame is one of: a direct link mode if the data frame is to be addressed to a non-AP station, and an uplink mode if the data frame is to be addressed to the AP; and
   the transmission mode of the traffic queue is one of: a Multi-User (MU) uplink (UL) mode if a data frame previously stored in the traffic queue has been transmitted, since a predetermined period of time, in a resource unit (RU) provided by the AP within a transmission opportunity granted to the AP on the communication channel, and Single-User (SU) mode otherwise;
   and wherein if the transmission mode of the data frame is direct link, the traffic queue in SU mode is selected for queueing the data frame,
   wherein the selected traffic queue is a SU mode traffic queue which priority is not greater than the priority of the data frame, and
   wherein the plurality of traffic queues are configured to serve data traffic at different priorities, and wherein the determined traffic queue in SU mode is a SU traffic queue which priority is not greater than the priority of the data frame.

7. A communication device station in a communication network comprising a plurality of stations and an access point (AP), the communication device comprising:
- a plurality of traffic queues;
- at least one microprocessor configured for carrying out the following steps:
  - obtaining a data frame to be queued in one of the plurality of traffic queues for transmission;
  - selecting a traffic queue based on at least one of:
    - a transmission mode, direct link or uplink, of a data frame, and
    - a transmission mode of the traffic queue; and
  - queueing the data frame in the selected traffic queue;

wherein:
- the transmission mode of the data frame is one of: a direct link mode if the data frame is to be addressed to a non-AP station, and an uplink mode if the station is to be addressed to the AP; and
- the transmission mode of the traffic queue is one of: a Multi-User (MU) uplink (UL) mode if a data frame previously stored in the traffic queue has been transmitted, since a predetermined period of time, in a resource unit (RU) provided by the AP within a transmission opportunity granted to the AP on the communication channel, and Single-User (SU) mode otherwise,
- wherein if the transmission mode of the data frame is direct link, the traffic queue in SU mode is selected for queueing the data frame,
- wherein the selected traffic queue is a SU mode traffic queue which priority is not greater than the priority of the data frame, and
- wherein the plurality of traffic queues are configured to serve data traffic at different priorities, and wherein the determined traffic queue in SU mode is a SU traffic queue which priority is not greater than the priority of the data frame.

* * * * *